US011130457B2

(12) United States Patent
Nakao et al.

(10) Patent No.: US 11,130,457 B2
(45) Date of Patent: Sep. 28, 2021

(54) CONTROL SYSTEM AND VEHICLE

(71) Applicants: Toyota Jidosha Kabushiki Kaisha, Toyota (JP); DENSO TEN Limited, Kobe (JP)

(72) Inventors: Kenji Nakao, Toyota (JP); Yuho Terai, Kobe (JP); Tsuyoshi Hirose, Toyoat (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 81 days.

(21) Appl. No.: 16/587,594

(22) Filed: Sep. 30, 2019

(65) Prior Publication Data

US 2020/0148139 A1   May 14, 2020

(30) Foreign Application Priority Data

Oct. 3, 2018   (JP) .............................. JP2018-188053

(51) Int. Cl.
| | |
|---|---|
| *B60R 16/03* | (2006.01) |
| *H01M 10/48* | (2006.01) |
| *H02J 1/14* | (2006.01) |
| *H02J 7/14* | (2006.01) |
| *H02J 7/34* | (2006.01) |
| *H02J 9/06* | (2006.01) |

(52) U.S. Cl.
CPC .......... *B60R 16/03* (2013.01); *H01M 10/482* (2013.01); *H02J 1/14* (2013.01); *H02J 7/1423* (2013.01); *H02J 7/34* (2013.01); *H02J 9/061* (2013.01); *H01M 10/486* (2013.01)

(58) Field of Classification Search
USPC ................................................... 307/10.1, 9.1
See application file for complete search history.

(56) References Cited

U.S. PATENT DOCUMENTS

2013/0127409 A1   5/2013   Ichikawa
2013/0193749 A1   8/2013   Nakamura et al.
(Continued)

FOREIGN PATENT DOCUMENTS

JP   2004280294 A   10/2004
JP   2013110822 A   6/2013
(Continued)

*Primary Examiner* — Toan T Vu
*Assistant Examiner* — Xuan Ly
(74) *Attorney, Agent, or Firm* — Dinsmore & Shohl LLP

(57) ABSTRACT

A power supply circuit includes a power supply switch configured to perform switching between connection and disconnection of an electric power supply path from a power supply to a second controller. The power supply switch is configured to be controlled by a first power supply signal transmitted from a first controller to the power supply circuit. The power supply circuit is configured to bring the power supply switch into a disconnected state to thereby bring the second controller into a stop state, when a prescribed disconnection condition is satisfied, the prescribed disconnection condition including a condition that the first power supply signal is switched from an on signal to an off signal. The second controller is configured to voluntarily enter the stop state or a power saving mode, when the second controller does not enter the stop state even if the disconnection condition is satisfied.

17 Claims, 7 Drawing Sheets

(56) References Cited

U.S. PATENT DOCUMENTS

| | | | |
|---|---|---|---|
| 2015/0008877 A1 | 1/2015 | Ichikawa et al. | |
| 2020/0041578 A1* | 2/2020 | Ito | H02J 1/08 |

FOREIGN PATENT DOCUMENTS

| | | | |
|---|---|---|---|
| JP | 2013126327 A | 6/2013 | |
| JP | 2013146148 A | 7/2013 | |
| JP | 2013146154 A | 7/2013 | |
| JP | 2013154815 A | 8/2013 | |
| JP | 2015050891 A | 3/2015 | |

* cited by examiner

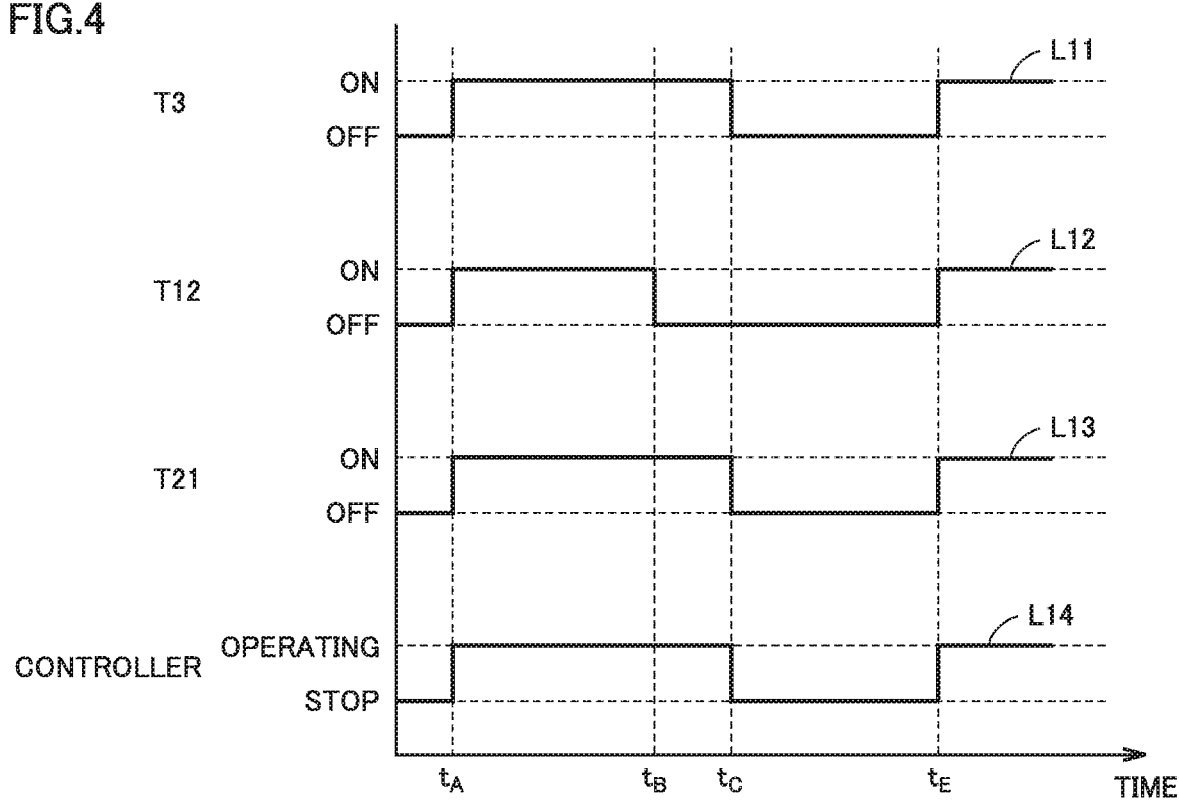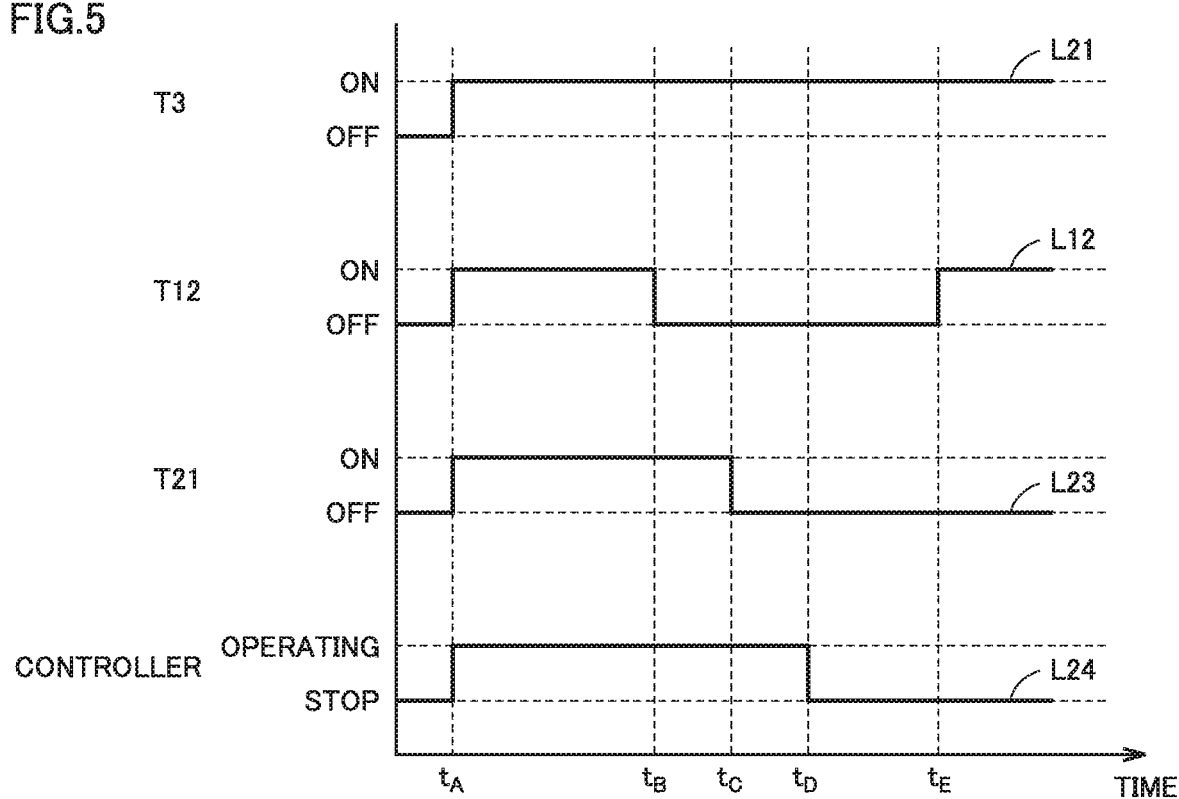

CONTROL SYSTEM AND VEHICLE

CROSS REFERENCE TO RELATED APPLICATIONS

This nonprovisional application claims priority to Japanese Patent Application No. 2018-188053 filed on Oct. 3, 2018 with the Japan Patent Office, the entire contents of which are hereby incorporated by reference.

BACKGROUND

Field

The present disclosure relates to a control system and a vehicle.

Description of the Background Art

In recent years, various power feeding methods such as an AC power wired power feeding method, a DC power wired power feeding method (e.g., a CHAdeMO method, a CCS (Combined Charging System) method and a GB/T method) and a wireless power feeding method (also referred to as "WPT (wireless power transfer) method") have been proposed as a power feeding method for supplying electric power used for charging of a vehicle-mounted battery to a vehicle. For example, Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327 disclose a WPT system configured to wirelessly transfer electric power from a primary coil of a power transmission device to a secondary coil of a power reception device.

A vehicle configured to be supplied with electric power used for charging of a vehicle-mounted battery in accordance with a plurality of power feeding methods may have a plurality of controllers mounted thereon, in order to individually control charging ECUs for the respective power feeding methods.

The vehicle having the plurality of controllers mounted thereon may be further provided with an integrated controller configured to execute integrated control of the plurality of controllers. For example, Japanese Patent Laying-Open No. 2004-280294 discloses a control system including a plurality of controllers (electric component modules) and an integrated controller configured to collectively manage on and off of a power supply of each controller.

SUMMARY

A driving battery configured to store electric power for electrically powered traveling and an auxiliary battery configured to store electric power for driving an auxiliary device are known as typical batteries (power supplies) mounted on a vehicle. Generally, a large-capacity and high-voltage secondary battery (e.g., a battery pack) is used as the driving battery, and a small-capacity and low-voltage secondary battery is used as the auxiliary battery.

In a control system configured such that on and off of a power supply of a second controller (e.g., the electric component module described in Japanese Patent Laying-Open No. 2004-280294) are controlled by a first controller (e.g., the integrated controller described in Japanese Patent Laying-Open No. 2004-280294), the above-described auxiliary battery can be used as the power supply of the second controller. For example, a power supply switch configured to perform switching between connection and disconnection of an electric power supply path from the auxiliary battery to the second controller is provided to be controllable by the first controller, and thus, the first controller can control on (supply) and off (stop) of the power supply of the second controller.

However, when the power supply switch is fixed to the on state (connected state) in the above-described control system, the power supply switch does not enter the off state even if the first controller tries to bring the power supply switch into the off state (disconnected state). Therefore, electric power continues to be supplied from the auxiliary battery to the second controller, and thus, a power shortage of the auxiliary battery (in the worst case, auxiliary battery depletion) is likely to occur.

The present disclosure has been made to solve the above-described problem, and an object of the present disclosure is to suppress a power shortage of a power supply of a second controller in a control system and a vehicle configured such that on (supply) and off (stop) of the power supply of the second controller are controlled by a first controller.

A control system of the present disclosure includes a first controller, at least one second controller, and a power supply circuit controlled by the first controller. The power supply circuit includes a power supply switch configured to perform switching between connection and disconnection of an electric power supply path from a power supply to the second controller. The power supply switch is configured to be controlled by a first power supply signal transmitted from the first controller to the power supply circuit. The power supply circuit is configured to bring the power supply switch into a disconnected state to thereby bring the second controller into a stop state, when a prescribed disconnection condition is satisfied, the prescribed disconnection condition including a condition that the first power supply signal is switched from an on signal to an off signal. The second controller is configured to voluntarily enter the stop state or a power saving mode, when the second controller does not enter the stop state even if the disconnection condition is satisfied.

In a normal state, the power supply circuit brings the power supply switch into the disconnected state to thereby bring the second controller into the stop state, when the disconnection condition is satisfied. However, when an abnormality occurs in the power supply circuit, the second controller does not enter the stop state in some cases even if the disconnection condition is satisfied. In this case, electric power continues to be supplied from the power supply to the second controller, and thus, a power shortage of the power supply is likely to occur. Accordingly, in the control system, the second controller voluntarily enters the stop state or the power saving mode, when the second controller does not enter the stop state even if the disconnection condition is satisfied. When the second controller switches from a normal operating state to the stop state or the power saving mode, electric power consumed in the second controller decreases. Therefore, even in a situation where the abnormality occurs in the power supply circuit and the electric power continues to be supplied from the power supply to the second controller, power consumption of the power supply is suppressed and a power shortage of the power supply is less likely to occur.

The stop state means a state in which the operation of the entire controller stops. On the other hand, the power saving mode is an operation mode in which electric power consumed in the controller can be reduced. The power saving mode includes a sleep mode prepared in general computers. In the power saving mode, the operation of a part of the controller is possible. For example, by operating only a prescribed function (i.e., stopping the other functions) in the controller, the consumed electric power can be reduced.

The second controller may be configured to voluntarily enter the stop state or the power saving mode and be prohibited from entering an operating state, when the second controller does not enter the stop state even if the disconnection condition is satisfied.

According to the above-described configuration, the second controller is prohibited from entering the operating state when the power supply circuit of the second controller has an abnormality. Therefore, startup of the second controller in a state where the power supply circuit has the above-described abnormality is suppressed.

The control system may further include a monitor circuit configured to inform the second controller about whether the first power supply signal is the on signal or the off signal. The power supply switch may be configured to be controlled not only by the first power supply signal but also by a second power supply signal transmitted from the second controller to the power supply circuit. The second controller may be configured to maintain the second power supply signal at an on signal until a prescribed self-holding period elapses since the first power supply signal is switched from the on signal to the off signal, and switch the second power supply signal to an off signal when the self-holding period elapses. The disconnection condition may be satisfied when the first power supply signal is the off signal and the second power supply signal is the off signal. The second controller may be configured to voluntarily enter the stop state or the power saving mode, when the second controller does not enter the stop state within a prescribed period after the second power supply signal is switched to the off signal.

According to the above-described configuration, even when a signal (first power supply signal=OFF) for stopping the second controller is issued from the first controller, the second controller can be maintained in the operating state until the self-holding period elapses. Since such a self-holding period is set, the second controller can perform a prescribed end process (e.g., saving of data) before the second controller enters the stop state.

The power supply circuit may include: a first switch configured to be controlled by the first power supply signal; and a second switch configured to be controlled by the second power supply signal. The power supply switch may be configured to enter a connected state when a ground potential is applied to the power supply switch. The first switch and the second switch may be connected in parallel between the power supply switch and a ground. According to such a configuration, it is possible to implement, with a simple configuration, a circuit in which the power supply switch enters the connected state when at least one of the first power supply signal and the second power supply signal is the on signal, and the power supply switch enters the disconnected state when the first power supply signal and the second power supply signal are both the off signals.

The power supply circuit may be configured to bring the power supply switch into a connected state to thereby start up the second controller, when a prescribed connection condition is satisfied, the prescribed connection condition including a condition that the first power supply signal is switched from the off signal to the on signal. The first controller may be configured to determine that the power supply circuit has an abnormality, when the second controller does not start up even if the connection condition is satisfied.

According to the above-described configuration, the first controller can recognize whether or not the power supply circuit of the second controller has an abnormality.

The second controller may be configured to transmit a prescribed signal to the first controller at the time of startup. The first controller may be configured to determine whether or not the second controller starts up, based on whether or not the first controller receives the prescribed signal.

According to the above-described configuration, the first controller can easily and accurately recognize whether or not the second controller starts up when the connection condition is satisfied.

The first controller may be configured to perform at least one of notification about occurrence of the abnormality and recording of occurrence of the abnormality, when the first controller determines that the power supply circuit has the abnormality.

According to the above-described configuration, a user can take measures quickly when an abnormality occurs in the power supply circuit. For example, as a result of the notification or the recording, the user can grasp the occurrence of the abnormality in the power supply circuit (e.g., fixation of the power supply switch to the connected state). Therefore, the user can replace the component (e.g., the power supply switch) having the abnormality, to thereby recover the power supply circuit (and further, return the power supply circuit to the normal state).

The at least one second controller may include a plurality of second controllers. The plurality of second controllers may each form charging ECUs configured to be supplied with electric power in accordance with different power feeding methods and perform charging of a vehicle-mounted battery. The first controller may be configured to individually control the power supply switch of each of the plurality of second controllers. The first controller may be configured to, when the charging is not performed, bring the power supply switch of each of the plurality of second controllers into the disconnected state. The first controller may be configured to, when the charging is performed using electric power supplied in accordance with a prescribed power feeding method, maintain the power supply switch of the at least one second controller not corresponding to the prescribed power feeding method in the disconnected state and bring the power supply switch of the second controller corresponding to the prescribed power feeding method into a connected state.

According to the above-described configuration, the first controller is configured to individually control the power supply switches of the second controllers to be turned on and off, and thus, the unused second controllers can be selectively turned off (stop state). When the charging is not performed, all of the power supply switches of the second controllers are turned off (disconnected state). As a result, electric power consumed in the second controllers can be reduced.

A vehicle of the present disclosure includes any control system described above. The power supply of the second controller in the control system is an auxiliary battery.

In the vehicle, a power shortage of the auxiliary battery (and further, auxiliary battery depletion) can be suppressed without increasing a capacity of the auxiliary battery.

The auxiliary battery is a vehicle-mounted battery configured to store electric power for driving an auxiliary device. The auxiliary device is a load that consumes electric power for purposes other than electrically powered traveling in the vehicle.

The auxiliary battery is distinguished from a driving battery configured to store electric power for electrically powered traveling. Examples of the auxiliary device include a vehicle-mounted audio device (e.g., a car stereo), a driving assist device (e.g., a car navigation system), an air conditioner, a lighting device (e.g., a headlight), a wiper device, a meter panel, and a vehicle-mounted electric component such as a control computer. In the case of a vehicle having an internal combustion engine mounted thereon, a distributor and a starter motor for operating the internal combustion engine are also included in the auxiliary device.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 shows transition of signals input to respective terminals of the circuit shown in FIG. 3 and transition of a state (operating/stop) of a controller of the lower ECU, when a power supply switch of the controller of the lower ECU is in a normal state, in power supply control of the controller of the lower ECU according to the embodiment of the present disclosure.

FIG. 5 shows transition of the signals input to the respective terminals of the circuit shown in FIG. 3 and transition of the state (operating/stop) of the controller of the lower ECU, when the power supply switch is fixed to a connected state after the controller of the lower ECU starts up, in the power supply control of the controller of the lower ECU according to the embodiment of the present disclosure.

DETAILED DESCRIPTION

Figure 1:
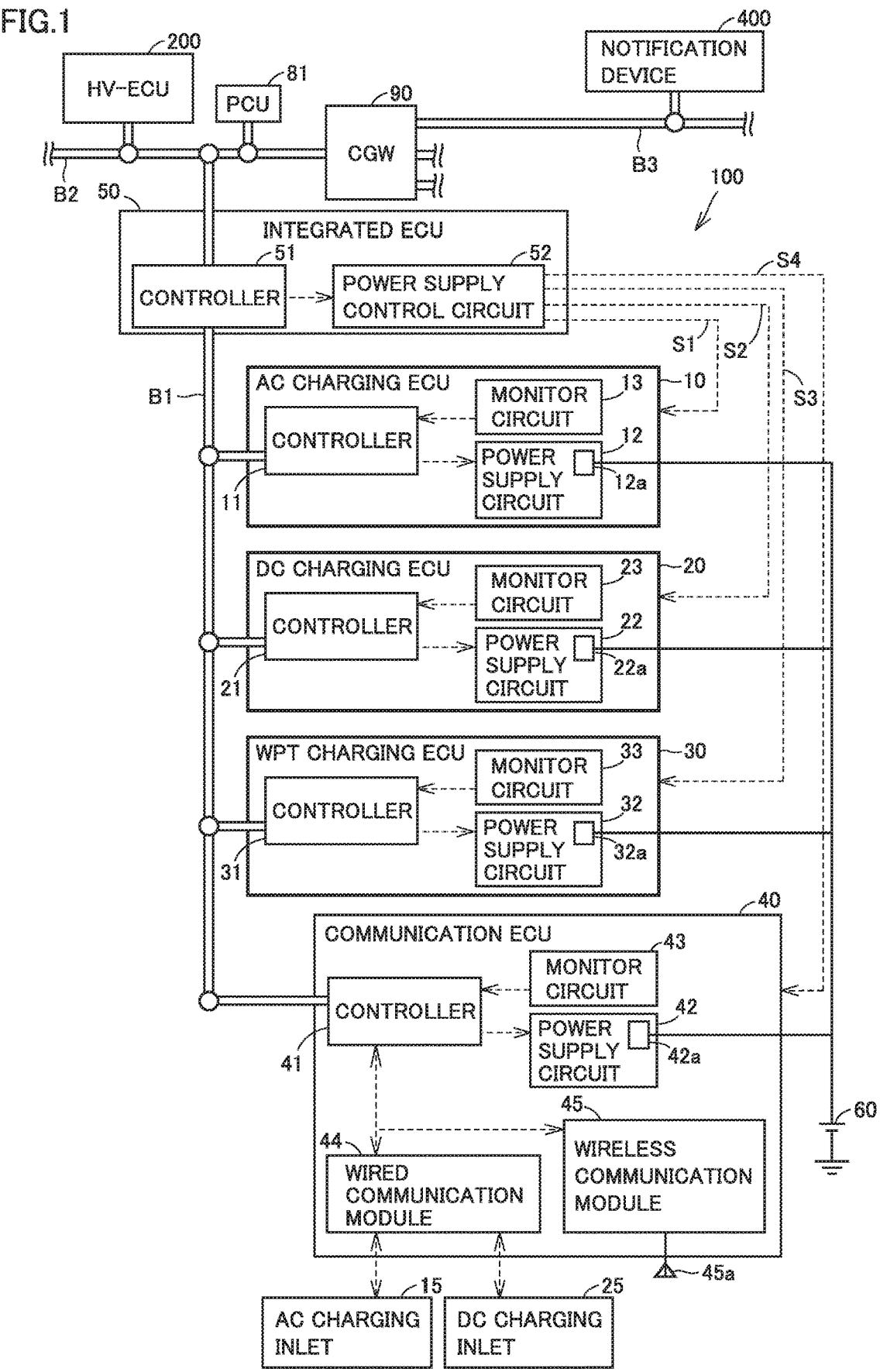
FIG. 1 is an overall configuration diagram of a control system according to an embodiment of the present disclosure.

An embodiment of the present disclosure will be described in detail with reference to the drawings, in which the same or corresponding components are denoted by the same reference characters and description thereof will not be repeated.

Hereinafter, description will be given of an example in which a control system according to the present embodiment is applied to a hybrid vehicle. However, the applicable range of the control system is not limited to the hybrid vehicle and the control system may be applied to an electric vehicle not having an engine mounted thereon. Hereinafter, an electronic control unit will be referred to as "ECU". In addition, a switch being in a connected state will be also referred to as "on state", and the switch being in a disconnected state will be also referred to as "off state".

FIG. 1 is an overall configuration diagram of a control system according to an embodiment of the present disclosure. Referring to FIG. 1, the control system according to the present embodiment includes a charging control device 100 and an HV (hybrid)-ECU 200. Charging control device 100 is configured to be supplied with electric power in accordance with a plurality of power feeding methods and execute charging control of a vehicle-mounted battery (e.g., a driving battery 70 shown in FIG. 2 below). HV-ECU 200 is configured to execute traveling control of a vehicle (e.g., a hybrid vehicle) having this system mounted thereon.

Charging control device 100 includes a plurality of charging ECUs (e.g., an AC charging ECU 10, a DC charging ECU 20 and a WPT charging ECU 30) for the respective power feeding methods, a communication ECU 40, and an integrated ECU 50. Communication ECU 40 is configured to communicate with charging facilities (e.g., an AC charging stand 110, a DC charging stand 120 and a WPT charging stand 130 shown in FIG. 2 below) external to the vehicle. Integrated ECU 50 is configured to communicate with each of AC charging ECU 10, DC charging ECU 20, WPT charging ECU 30, and communication ECU 40.

AC charging ECU 10, DC charging ECU 20, WPT charging ECU 30, communication ECU 40, and integrated ECU 50 include controllers 11, 21, 31, 41, and 51, respectively. Controller 51 according to the present embodiment corresponds to one example of "first controller" according to the present disclosure. Each of controllers 11, 21, 31, and 41 according to the present embodiment corresponds to one example of "second controller" according to the present disclosure.

Each of controllers 11, 21, 31, 41, and 51 and HV-ECU 200 described above includes a processor, a memory device, an input/output port, and a communication port (all are not shown). A CPU (Central Processing Unit) can, for example, be used as the processor. The memory device includes a RAM (Random Access Memory) configured to temporarily store data, and a storage (a ROM (Read Only Memory) and a rewritable nonvolatile memory) configured to save a program and other information. The processor executes the program stored in the memory device and various types of control are thereby executed. The various types of control can be processed not only by software but also by dedicated hardware (electronic circuit). A microcomputer may be used as a controller having the above-described hardware configuration.

The control system according to the present embodiment further includes an auxiliary battery 60. Auxiliary battery 60 is a vehicle-mounted battery of a low voltage system (e.g., a 12 V system) and supplies electric power to an auxiliary device mounted on the vehicle. A lead battery can, for example, be used as auxiliary battery 60. However, a secondary battery (e.g., a nickel-metal hydride battery) other than the lead battery may be used as auxiliary battery 60.

The auxiliary device (e.g., a notification device 400 described below and various controllers) mounted on the vehicle is driven by driving electric power (e.g., electric power having a voltage of approximately 5 V to 12 V) generated using the electric power of auxiliary battery 60. Auxiliary battery 60 functions as a power supply for starting up the controllers (e.g., controllers 11, 21, 31, 41, and 51) included in the control system.

Integrated ECU 50 is configured to execute integrated control of AC charging ECU 10, DC charging ECU 20, WPT charging ECU 30, and communication ECU 40. AC charging ECU 10, DC charging ECU 20, WPT charging ECU 30, and communication ECU 40 correspond to lower ECUs for integrated ECU 50, and integrated ECU 50 corresponds to an upper ECU for these lower ECUs. Integrated ECU 50 includes a power supply control circuit 52 configured to execute power supply control of each lower ECU. When integrated ECU 50 executes the power supply control of each lower ECU, a control signal is transmitted from controller 51 to a power supply circuit of the lower ECU through power supply control circuit 52. Details of a circuit configuration of power supply control circuit 52 will be described below (see FIG. 3).

Integrated ECU 50 is connected to AC charging ECU 10, DC charging ECU 20, WPT charging ECU 30, and communication ECU 40 through direct control lines (hereinafter, also referred to as "direct lines") S1, S2, S3, and S4 directly connecting the devices in a one-to-one relationship, respectively. By using direct lines S1, S2, S3, and S4 for transmission of the control signal, the control speed increases.

AC charging ECU 10, DC charging ECU 20, WPT charging ECU 30, and communication ECU 40 include power supply circuits 12, 22, 32, and 42, and monitor circuits 13, 23, 33, and 43, respectively. Power supply circuits 12, 22, 32, and 42 include switches 12a, 22a, 32a, and 42a controlled to be turned on and off by integrated ECU 50, respectively.

Switches 12a, 22a, 32a, and 42a are power supply switches configured to perform switching between connection and disconnection of electric power supply paths from auxiliary battery 60 to controllers 11, 21, 31, and 41, respectively. When switches 12a, 22a, 32a, and 42a are in the on state (connected state), electric power is supplied from auxiliary battery 60 to controllers 11, 21, 31, and 41, respectively. When switches 12a, 22a, 32a, and 42a are in the off state (disconnected state), electric power is not supplied from auxiliary battery 60 to controllers 11, 21, 31, and 41, respectively. Even when electric power is supplied to the controllers (e.g., controllers 11, 21, 31, and 41) in the stop state, a certain amount of electric power is consumed. Therefore, by stopping the electric power supply, the consumed electric power can be reduced. Auxiliary battery 60 is a power supply common to controllers 11, 21, 31, and 41.

Each power supply switch is controlled to be turned on and off by controller 51 of integrated ECU 50. More specifically, switches 12a, 22a, 32a, and 42a are controlled by a first power supply signal transmitted from controller 51 to power supply circuits 12, 22, 32, and 42 through direct lines S1, S2, S3, and S4, respectively. The first power supply signal is either an on signal or an off signal. Controller 51 sets the first power supply signal at the on signal when bringing the power supply switch into the on state, and sets the first power supply signal at the off signal when bringing the power supply switch into the off state.

Power supply circuits 12, 22, 32, and 42 are configured to bring switches 12a, 22a, 32a, and 42a into the connected state and start up controllers 11, 21, 31, and 41, respectively, when a prescribed connection condition is satisfied, the prescribed connection condition including a condition that the above-described first power supply signal is switched from the off signal to the on signal. In the present embodiment, when the first power supply signal is switched from the off signal to the on signal, the connection condition is satisfied. For example, when integrated ECU 50 corresponding to the upper ECU turns on a power supply of one controller (in the present embodiment, one of controllers 11, 21, 31, and 41) of one lower ECU, controller 51 of integrated ECU 50 switches the first power supply signal transmitted to the power supply circuit (i.e., one of power supply circuits 12, 22, 32, and 42) of the lower ECU from the off signal to the on signal. As a result, the power supply switch (i.e., one of switches 12a, 22a, 32a, and 42a) of the power supply circuit of the lower ECU enters the on state and the controller of the lower ECU starts up. Then, the started controller of the lower ECU transmits a second power supply signal to the power supply circuit of the lower ECU. The second power supply signal transmitted from the controller to the power supply circuit in the lower ECU is either an on signal or an off signal, and the second power supply signal transmitted at the time of startup of the controller is the on signal. That is, at the time of startup of the controller of the lower ECU, the first power supply signal and the second power supply signal received by the power supply circuit of the lower ECU are both the on signals.

In addition, power supply circuits 12, 22, 32, and 42 are configured to bring switches 12a, 22a, 32a, and 42a into the disconnected state and bring controllers 11, 21, 31, and 41 into the stop state, respectively, when a prescribed disconnection condition is satisfied, the prescribed disconnection condition including a condition that the above-described first power supply signal is switched from the on signal to the off signal. In the present embodiment, when the above-described first power supply signal is the off signal and the above-described second power supply signal is the off signal, the disconnection condition is satisfied. For example, when integrated ECU 50 corresponding to the upper ECU turns off a power supply of one controller (in the present embodiment, one of controllers 11, 21, 31, and 41) of one lower ECU, controller 51 of integrated ECU 50 switches the first power supply signal transmitted to the power supply circuit (i.e., one of power supply circuits 12, 22, 32, and 42) of the lower ECU to the off signal.

The controller of the lower ECU maintains the second power supply signal at the on signal until a prescribed period (hereinafter, referred to as "self-holding period") elapses since the first power supply signal was switched from the on signal to the off signal as described above. The controller of the lower ECU saves prescribed information (i.e., stores the prescribed information in the storage) during the self-holding period. The saved information includes, for example, at least one of diagnosis information and learning values. The diagnosis information is information used in a process (on-board diagnostics) for the vehicle itself to diagnose whether or not the vehicle is operating normally. The learning values are values of various parameters used in learning control.

When the above-described self-holding period elapses, the controller of the lower ECU switches the second power supply signal to the off signal. As a result, the above-described disconnection condition is satisfied and the power supply switch of the power supply circuit of the lower ECU enters the off state. When the power supply switch enters the off state, the controller of the lower ECU enters the stop state.

Monitor circuits 13, 23, 33, and 43 are configured to inform controllers 11, 21, 31, and 41 about whether the first power supply signal transmitted from controller 51 to power supply circuits 12, 22, 32, and 42 is the on signal or the off signal, respectively. In the present embodiment, the first power supply signal transmitted from integrated ECU 50 corresponding to the upper ECU to the lower ECU is input to both the power supply circuit and the monitor circuit of the lower ECU. Details of circuit configurations of the power supply circuit and the monitor circuit of the lower ECU will be described below (see FIG. 3).

Each of power supply circuits 12, 22, 32, and 42 according to the present embodiment corresponds to one example of "power supply circuit" according to the present disclosure. In addition, each of switches 12a, 22a, 32a, and 42a according to the present embodiment corresponds to one example of "power supply switch" according to the present disclosure.

Communication ECU 40 further includes a wired communication module 44 and a wireless communication module 45. Each of wired communication module 44 and wireless communication module 45 is controlled by controller 41 to communicate with the outside of the vehicle and output a signal received from outside the vehicle to controller 41.

Wired communication module 44 includes, for example, a CPLT (control pilot) circuit and a PLC (Power Line Communication) modem (both are not shown). Wired communication module 44 is configured to perform wired communication with a prescribed charging stand (e.g., AC charging stand 110 and DC charging stand 120 shown in FIG. 2 below) through a signal line housed in a charging cable.

Wireless communication module 45 is a communication module for wireless communication. Examples of wireless communication module 45 include a WiFi (registered trademark) module configured to perform wireless communication in accordance with the communication standards IEEE802.11. Wireless communication module 45 includes an antenna 45a (e.g., a WiFi (registered trademark) antenna). Communication ECU 40 can access an access point of a prescribed network (e.g., a wireless LAN (Local Area Network)) through wireless communication module 45, to thereby wirelessly communicate with another communication device (e.g., WPT charging stand 130 shown in FIG. 2 below) connected to the network.

The control system according to the present embodiment further includes a CGW (central gateway) 90, a local bus B1 and a global bus B2. Local bus B1 is, for example, a charging-dedicated line used only for the charging control. Global bus B2 is a communication bus for a powertrain connected to CGW 90. Global bus B2 is also connected to another global bus (e.g., a body global bus, a safety global bus, an information global bus, and a diagnosis global bus) through CGW 90. Each global bus connected to CGW 90 is, for example, a CAN (Controller Area Network) bus and forms a vehicle-mounted LAN for each system. CGW 90 has a relay function (e.g., sequential relay, cycle conversion relay and data recombining relay) and is configured to relay a message between the global buses. On the other hand, local bus B1 is not connected to CGW 90 and the global buses (global bus B2 and the other global buses) connected to CGW 90, and connects the prescribed controllers (controllers 11, 21, 31, 41, and 51) included in charging control device 100 to communicate with each other. Charging control device 100 can execute the charging control of the vehicle-mounted battery (in the present embodiment, driving battery 70), while exchanging information among the above-described controllers (i.e., controllers 11, 21, 31, 41, and 51) through local bus B1.

HV-ECU 200, controller 51 of integrated ECU 50 and a controller of a PCU (Power Control Unit) 81 are connected to global bus B2. HV-ECU 200 can execute traveling control of the vehicle based on information obtained from the other global buses and transmit information about traveling to the other global buses, while exchanging the information with global bus B2 and the other global buses through CGW 90. In the present embodiment, only integrated ECU 50, of AC charging ECU 10, DC charging ECU 20, WPT charging ECU 30, communication ECU 40, and integrated ECU 50, is connected to global bus B2. HV-ECU 200 can transmit information to integrated ECU 50 through global bus B2. HV-ECU 200 can also control PCU 81 through global bus B2.

Notification device 400 is connected to a global bus B3 that is one of the other global buses. Notification device 400 is configured to perform a prescribed notification process for notifying a user (e.g., a driver of the vehicle) when notification device 400 receives a request from integrated ECU 50, for example. Examples of notification device 400 include a display device, a speaker and a lamp. Notification device 400 may be a meter panel or a car navigation system.

Figure 2:
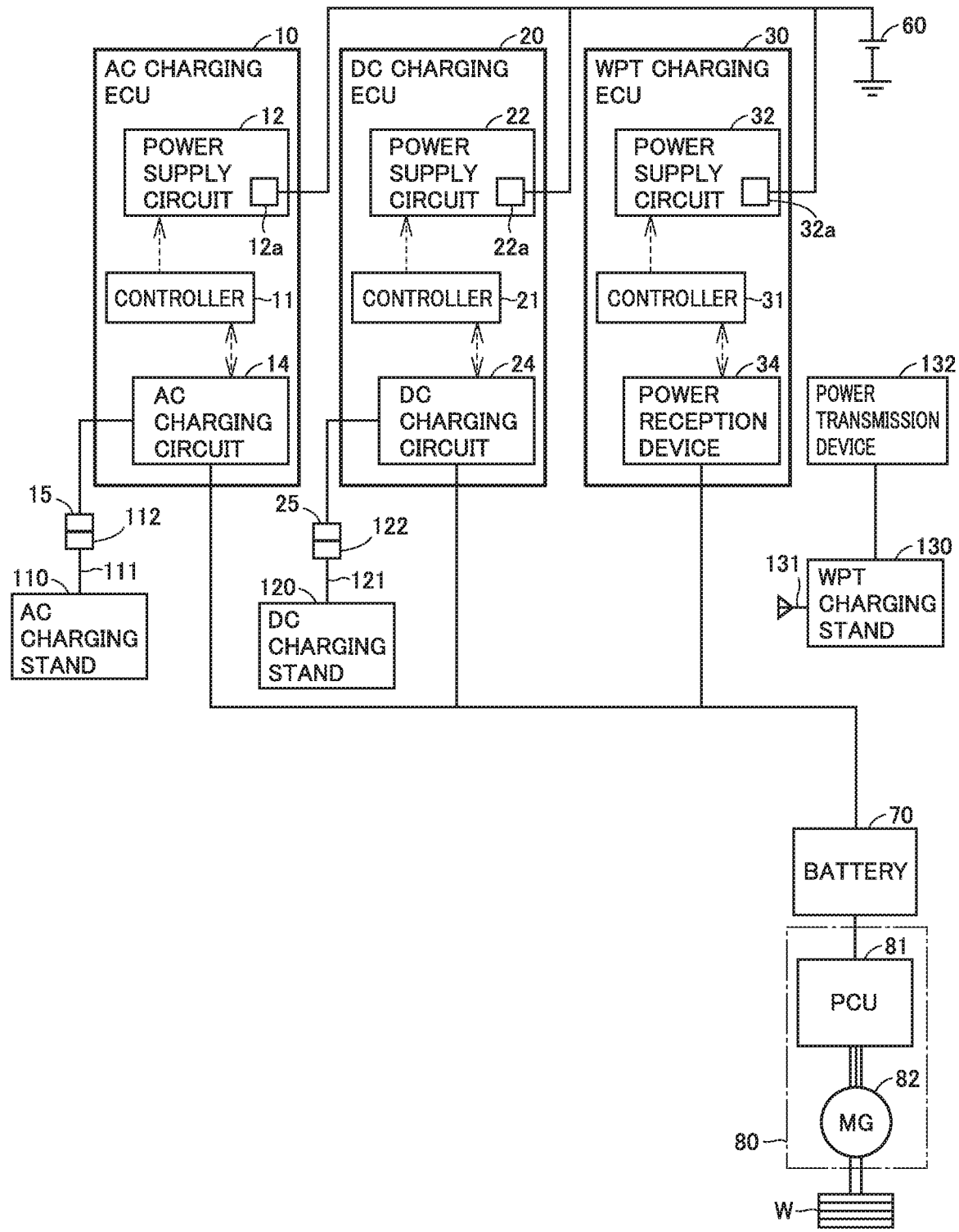
FIG. 2 shows a configuration (particularly, a charging path of a vehicle-mounted battery) of a vehicle according to the embodiment of the present disclosure.

FIG. 2 shows a configuration (particularly, a charging path of the vehicle-mounted battery) of the vehicle (i.e., the vehicle including the control system shown in FIG. 1) according to the present embodiment, together with the charging stands. Referring to FIG. 2 together with FIG. 1, the vehicle further includes driving battery 70, a travel driving device 80 and a driving wheel W, in addition to charging control device 100, CGW 90, various devices (e.g., HV-ECU 200) connected to the global buses, and auxiliary battery 60 shown in FIG. 1.

Travel driving device 80 includes PCU 81 and an MG (Motor Generator) 82, and is configured to cause the vehicle to travel using electric power stored in driving battery 70. Travel driving device 80 is controlled by HV-ECU 200. Driving battery 70 is a vehicle-mounted battery configured to store electric power for electrically powered traveling and is charging-controlled by charging control device 100. Driving battery 70 according to the present embodiment corresponds to one example of "vehicle-mounted battery" according to the present disclosure. Although not shown, the vehicle further includes an engine (internal combustion engine). The vehicle according to the present embodiment is a hybrid vehicle that can travel using both of the electric power stored in driving battery 70 and an output of the engine (not shown). The kinetic energy generated by the engine is split by a power split device (not shown) and is used to drive driving wheel W and used for power generation in a not-shown MG.

Driving battery 70 includes a secondary battery such as a lithium ion battery or a nickel-metal hydride battery, a charging relay controlled to be turned on and off by integrated ECU 50, an SMR (system main relay) controlled to be turned on and off by HV-ECU 200, and a monitoring device configured to monitor a state of driving battery 70 (all are not shown). Driving battery 70 has a rated voltage of, for example, 100 V to 400 V. Driving battery 70 may include a battery pack formed by connecting a plurality of secondary batteries. The monitoring device includes various sensors configured to detect a state (e.g., a temperature, a current and a voltage) of driving battery 70, and outputs a result of detection. The charging relay is turned on when driving battery 70 is charged by the charging stand. The SMR is turned on when the vehicle travels using the electric power of driving battery 70. The result of detection by the monitoring device (the detection values of various sensors) is input to I-V-ECU 200, and HV-ECU 200 obtains the state (e.g., the SOC (State of Charge)) of driving battery 70 based on the output of the monitoring device. The state of driving battery 70 is output from HV-ECU 200 to integrated ECU 50 in accordance with a request signal from integrated ECU 50. A state of the SMR is also output from HV-ECU 200 to integrated ECU 50 in accordance with a request signal from integrated ECU 50.

Driving battery 70 supplies electric power for driving wheel W by MG 82 to PCU 81. MG 82 is a rotating electric machine and is, for example, a three-phase AC motor generator. MG 82 is driven by PCU 81 and rotates driving wheel W. MG 82 can also perform regenerative power generation during braking of the vehicle.

PCU 81 includes a controller including a processor (e.g., a CPU), an inverter and a converter (all are not shown). The controller of PCU 81 receives an instruction (control signal) from HV-ECU 200 through global bus B2 and controls the inverter and the converter of PCU 81 in accordance with the instruction. During power running driving of MG 82, PCU 81 converts the electric power stored in driving battery 70 to AC power and supplies the AC power to MG 82. During power generation by MG 82, PCU 81 rectifies the generated electric power and supplies the rectified electric power to driving battery 70. The operation of MG 82 and the engine (not shown) is cooperatively controlled by HV-ECU 200 to become an appropriate operation depending on the condition of the vehicle.

Generally, the charging stands are roughly divided into a normal charger configured to supply AC power to the vehicle through the charging cable, a quick charger configured to supply DC power to the vehicle through the charging cable, and a wireless charger configured to wirelessly supply electric power to the vehicle. In the present embodiment, AC charging stand 110 corresponds to the normal charger, DC charging stand 120 corresponds to the quick charger, and WPT charging stand 130 corresponds to the wireless charger. AC charging stand 110 and DC charging stand 120 are connected to the vehicle by charging cables 111 and 121, respectively. Each of charging cables 111 and 121 includes a signal line (e.g., a CPLT line) and a power line therein. Electric power is supplied through the power line. Communication (i.e., exchange of information) is performed through the signal line. In the present embodiment, DC charging stand 120 corresponds to a DC charging stand for the CCS method (also referred to as "combo method"). However, the power feeding method of the DC charging stand is not limited to the CCS method and may be the CHAdeMO method. WPT charging stand 130 includes an antenna 131 configured to perform wireless communication (e.g., wireless communication by WiFi (registered trademark)), and a power transmission device 132 including a power transmission coil (not shown). Power transmission device 132 is placed on, for example, a ground surface of a parking lot. Charging by any charging stands described above is performed when the vehicle is in the stop state.

AC charging ECU 10 is a charging ECU corresponding to the power feeding method (the AC method) of AC charging stand 110, and further includes an AC charging circuit 14 in addition to controller 11, power supply circuit 12 and monitor circuit 13 shown in FIG. 1. AC charging circuit 14 includes, for example, a filter circuit, a rectifying circuit, and various sensors configured to detect a state (e.g., a temperature, a current and a voltage) of each portion (all are not shown). A result of detection by the sensors indicating the state of each portion in AC charging circuit 14 is output to controller 11 and is further transmitted from controller 11 to integrated ECU 50 through local bus B1. Controller 11 receives an instruction (control signal) from integrated ECU 50 through local bus B1 and controls AC charging circuit 14 in accordance with the instruction. When a prescribed charging start condition is satisfied in a state where an AC charging connector 112 of a charging cable 111 connected to AC charging stand 110 is in connection with an AC charging inlet 15 of the vehicle, controller 11 is started up by integrated ECU 50 and charges driving battery 70 with the electric power supplied from AC charging stand 110 through charging cable 111 (more particularly, the power line in the cable). During charging of driving battery 70 by AC charging stand 110, the electric power of AC charging stand 110 is supplied to driving battery 70 through AC charging circuit 14.

DC charging ECU 20 is a charging ECU corresponding to the power feeding method (the DC method) of DC charging stand 120, and further includes a DC charging circuit 24 in addition to controller 21, power supply circuit 22 and monitor circuit 23 shown in FIG. 1. DC charging circuit 24 includes, for example, a filter circuit, and various sensors configured to detect a state (e.g., a temperature, a current and a voltage) of each portion (all are not shown). A result of detection by the sensors indicating the state of each portion in DC charging circuit 24 is output to controller 21 and is further transmitted from controller 21 to integrated ECU 50 through local bus B1. Controller 21 receives an instruction (control signal) from integrated ECU 50 through local bus B1 and controls DC charging circuit 24 in accordance with the instruction. When a prescribed charging start condition is satisfied in a state where a DC charging connector 122 of a charging cable 121 connected to DC charging stand 120 is in connection with a DC charging inlet 25 of the vehicle, controller 21 is started up by integrated ECU 50 and charges driving battery 70 with the electric power supplied from DC charging stand 120 through charging cable 121 (more particularly, the power line in the cable). During charging of driving battery 70 by DC charging stand 120, the electric power of DC charging stand 120 is supplied to driving battery 70 through DC charging circuit 24.

WPT charging ECU 30 is a charging ECU corresponding to the power feeding method (the wireless method) of WPT charging stand 130, and further includes a power reception device 34 in addition to controller 31, power supply circuit 32 and monitor circuit 33 shown in FIG. 1. Power reception device 34 includes, for example, a WPT charging circuit including a power reception coil, a filter circuit and a rectifying circuit, and various sensors configured to detect a state (e.g., a temperature, a current and a voltage) of each portion (all are not shown). A result of detection by the sensors indicating the state of each portion in power reception device 34 is output to controller 31 and is further transmitted from controller 31 to integrated ECU 50 through local bus B1. Controller 31 receives an instruction (control signal) from integrated ECU 50 through local bus B1 and controls power reception device 34 (e.g., the WPT charging circuit) in accordance with the instruction. When a prescribed charging start condition is satisfied in a state where connection of wireless communication between wireless communication module 45 of the vehicle and WPT charging stand 130 is established, controller 31 is started up by integrated ECU 50 and charges driving battery 70 with the electric power wirelessly transmitted from WPT charging stand 130. During charging of driving battery 70 by WPT charging stand 130, the electric power of WPT charging stand 130 is supplied to driving battery 70 through power reception device 34. The power reception coil of power reception device 34 wirelessly receives electric power transmitted from the power transmission coil of power transmission device 132. As a result, the electric power is wirelessly transferred from the power transmission coil of power transmission device 132 to the power reception coil of power reception device 34 through a magnetic field. Examples of the wireless power transfer method include a magnetic resonance method. In some embodiments of the magnetic resonance method, a Q value indicating the resonance intensity of a resonance circuit is not less than 100. However, the wireless power transfer method is not limited to the magnetic resonance method and other methods (e.g., an electromagnetic induction method) may be used.

The charging ECUs (AC charging ECU 10, DC charging ECU 20 and WPT charging ECU 30) are configured to be supplied with electric power in accordance with different power feeding methods and charge driving battery 70. The controller (controller 51) of integrated ECU 50 is configured to individually control the power supply switches (switches 12a, 22a and 32a) of the controllers (controllers 11, 21 and 31) of the charging ECUs and the power supply switch (switch 42a) of the controller (controller 41) of communication ECU 40 to be turned on and off. Controller 51 is configured to control switches 12a, 22a, 32a, and 42a through direct lines S1, S2, S3, and S4, respectively.

When driving battery 70 is charged by the charging facility (in the present embodiment, one of AC charging stand 110, DC charging stand 120 and WPT charging stand 130) external to the vehicle, integrated ECU 50 corresponding to the upper ECU executes the power supply control of each lower ECU (AC charging ECU 10, DC charging ECU 20, WPT charging ECU 30) as described below, for example.

Before power feeding from the charging stand to the vehicle starts, communication ECU 40 of the vehicle is communicatively connected to the charging stand. In the state where the charging stand and the vehicle are communicable with each other, controller 51 determines the power feeding method of the charging stand based on information obtained by communication with the charging stand. As a result, the power feeding method is identified. Thereafter, when the prescribed charging start condition is satisfied, controller 51 brings the power supply switch (i.e., one of switches 12a, 22a and 32a) of the controller of the charging ECU corresponding to the identified power feeding method into the on state. Switching of the power supply switch from the off state to the on state is controlled by the first power supply signal transmitted from controller 51 to the power supply circuit of the charging ECU. When the power supply switch of the charging ECU corresponding to the power feeding method of the charging stand enters the on state, the controller (i.e., one of controllers 11, 21 and 31) of the charging ECU starts up. Then, the charging control is executed by the started controller.

The charging control is executed through communication between the controller (i.e., one of controllers 11, 21 and 31) of the charging ECU corresponding to the power feeding method of the charging stand and controller 51. Controller 51 is configured to communicate with controllers 11, 21 and 31 through local bus B1, to thereby control charging of driving battery 70 with the electric power supplied from AC charging stand 110, DC charging stand 120 and WPT charging stand 130, respectively. During charging, communication between controller 51 and controllers 11, 21 and 31 is monitored. In the present embodiment, each of controller 41 and controller 51 is configured to monitor the presence or absence of unauthorized communication about the communication through local bus B1 by using a prescribed method, and perform a prescribed process when the unauthorized communication is detected. Each of controller 41 and controller 51 is configured to detect the unauthorized communication in cooperation with at least one of a firewall and an error detection function of CAN communication (e.g., communication through local bus B1). At least one of a process for suppressing expansion of damage caused by the unauthorized communication (e.g., power-off of controller 41 of communication ECU 40 or prohibition of the communication through local bus B1) and a process for repairing a portion damaged by the unauthorized communication (e.g., reprogramming of a falsified program) can be used as the process performed when the unauthorized communication is detected.

When the above-described charging ends, integrated ECU 50 corresponding to the upper ECU executes the power supply control of each lower ECU (AC charging ECU 10, DC charging ECU 20, WPT charging ECU 30) as described below, for example.

When a prescribed charging end condition is satisfied, controller 51 brings the power supply switch (i.e., one of switches 12a, 22a and 32a) of the charging ECU corresponding to the identified power feeding method into the off state. Switching of the power supply switch from the on state to the off state is controlled by the first power supply signal transmitted from controller 51 to the power supply circuit of the charging ECU and the second power supply signal transmitted from the controller to the power supply circuit in the charging ECU. When the self-holding period elapses since the first power supply signal was switched from the on signal to the off signal, the second power supply signal is switched from the on signal to the off signal. When the first power supply signal and the second power supply signal are both the off signals, the above-described power supply switch enters the off state and the controller of the charging ECU enters the stop state. In the control system according to the present embodiment, the above-described power supply control is executed, and thus, all of the power supply switches of controllers 11, 21 and 31 are in the off state when charging is not performed.

As described above, when charging is not performed, controller 51 brings all of the power supply switches (i.e., switches 12a, 22a and 32a) of controllers 11, 21 and 31 into the off state. When charging is performed using electric power supplied in accordance with a prescribed power feeding method (e.g., the wireless method), controller 51 maintains the power supply switches (e.g., switches 12a and 22a) of the controllers not corresponding to the above-described prescribed power feeding method, of controllers 11, 21 and 31, in the off state and brings the power supply switch (e.g., switch 32a) of the controller corresponding to the above-described prescribed power feeding method into the on state. According to such a configuration, all of the power supplies of the controllers of the charging ECUs are brought into the off state when charging is not performed, and the controllers of the unused charging ECUs are selectively brought into the off state when charging is performed. As a result, electric power consumed in the vehicle-mounted controller can be reduced and unauthorized information is less likely to enter the vehicle as a result of communication with the charging stand.

In the control system according to the present embodiment, when the power supply circuit of the lower ECU is in the normal state, the power supply switch of the controller of the lower ECU is controlled to be turned on and off in accordance with the first power supply signal transmitted from the upper ECU to the power supply circuit of the lower ECU. More specifically, when the self-holding period elapses since the first power supply signal was switched from the on signal to the off signal, the power supply circuit brings the controller into the stop state in the lower ECU. However, when the power supply switch of the power supply circuit of the lower ECU is fixed to the on state, the power supply switch does not enter the off state even if the self-holding period elapses. Therefore, when the above-described fixation occurs, electric power continues to be supplied from auxiliary battery 60 to the controller of the lower ECU, and thus, a power shortage of auxiliary battery 60 (in the worst case, auxiliary battery depletion) is likely to occur. In the present embodiment, a capacity of auxiliary battery 60 is determined based on the assumption that a large amount of electric power is not consumed when the vehicle is in the stop state. Therefore, if consumption of a large amount of electric power occurs when the vehicle is in the stop state, auxiliary battery depletion may occur.

Accordingly, in the control system according to the present embodiment, the controller (controller 11, 21, 31, 41) of each lower ECU is configured to voluntarily enter the stop state or a power saving mode, when the controller does not enter the stop state after the self-holding period elapses.

Figure 3:
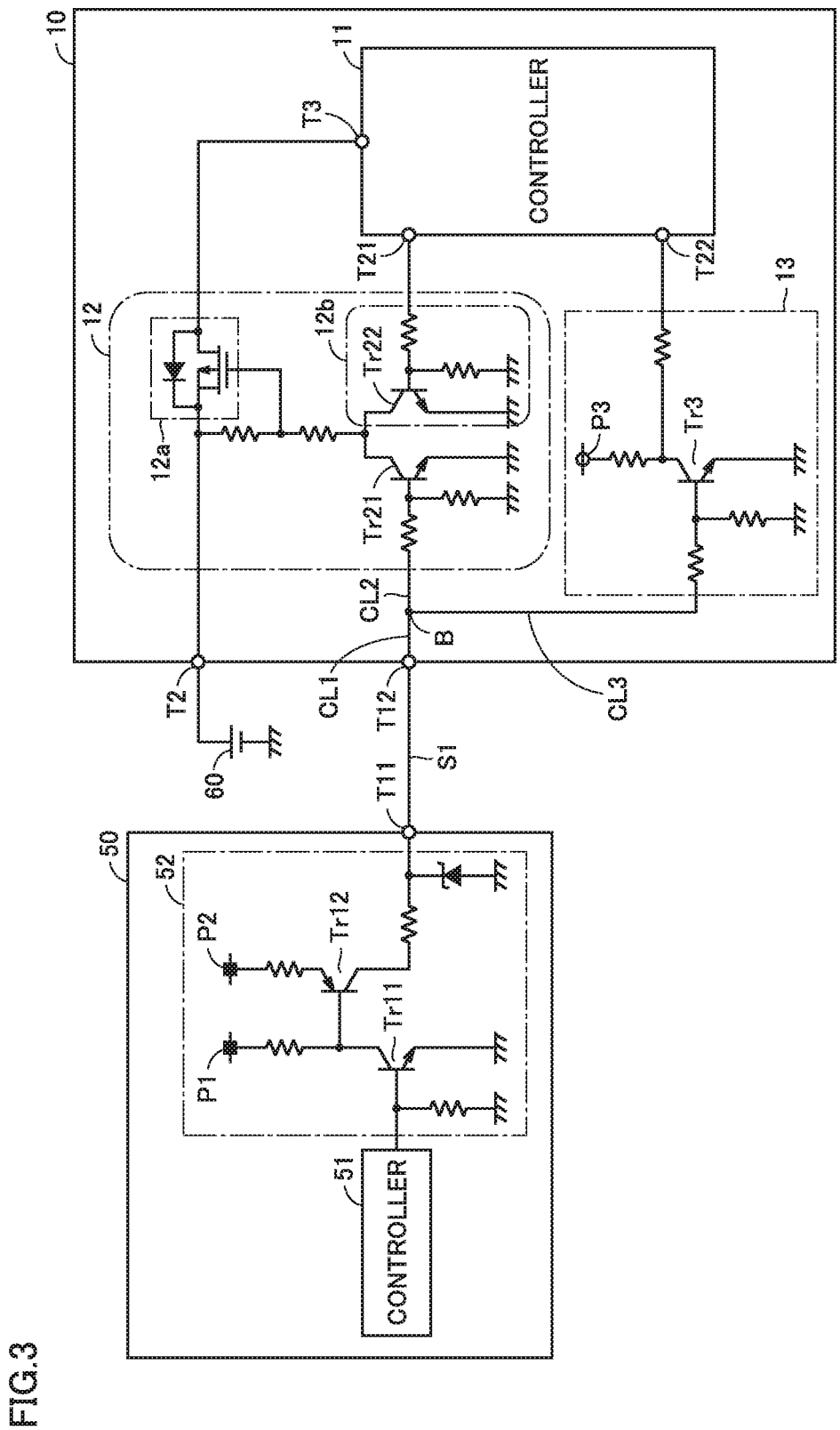
FIG. 3 shows a circuit configuration of each of a power supply control circuit in an upper ECU and a power supply circuit and a monitor circuit in a lower ECU.

FIG. 3 shows a circuit configuration of each of power supply control circuit 52 of integrated ECU 50 (upper ECU) and power supply circuit 12 and monitor circuit 13 of AC charging ECU 10 (lower ECU). Although FIG. 3 representatively shows the circuit configuration of power supply circuit 12 and monitor circuit 13 of AC charging ECU 10, power supply circuits 22, 32 and 42 and monitor circuits 23, 33 and 43 of the other lower ECUs also have a similar circuit configuration.

Referring to FIG. 3, integrated ECU 50 has a terminal T11, and AC charging ECU 10 has terminals T2 and T12. Electric power is supplied from auxiliary battery 60 to terminal T2 of AC charging ECU 10. Power supply wirings P1 to P3 are maintained at a potential (hereinafter, also referred to as "power supply potential") higher than a ground potential, using a voltage of driving battery 70 or auxiliary battery 60, for example. A potential difference between each of power supply wirings P1 to P3 and a ground can be arbitrarily set.

Power supply control circuit 52 includes transistors Tr11 and Tr12. In the present embodiment, transistor Tr11 is an NPN-type bipolar transistor, and transistor Tr12 is a PNP-type bipolar transistor.

An emitter of transistor Tr11 is grounded and a voltage of power supply wiring P1 is applied between the emitter and a collector of transistor Tr11. When a potential applied from controller 51 to a base of transistor Tr11 is a low-level potential (e.g., the ground potential), transistor Tr11 is off. That is, when controller 51 is in the stop state (e.g., power-off), transistor Tr11 is off. When transistor Tr11 is off, a power supply potential of power supply wiring P1 is applied to a base of transistor Tr12 and transistor Tr12 is turned off. On the other hand, when a high-level potential (i.e., a potential higher than the ground potential) is applied from controller 51 to the base of transistor Tr11, transistor Tr11 is turned on. When transistor Tr11 in on, a base potential of transistor Tr12 is the ground potential and transistor Tr12 is turned on.

An emitter of transistor Tr12 is connected to power supply wiring P2 and a collector of transistor Tr12 is connected to terminal Tr11. When transistor Tr12 is off, a potential of terminal T111 is the ground potential. When transistor Tr12 is on, a power supply potential of power supply wiring P2 is applied to terminal T11. The potential of terminal T11 that changes in accordance with the potential (high level/low level) applied from controller 51 to the base of transistor Tr11 corresponds to the above-described first power supply signal. The first power supply signal is transmitted from controller 51 and output to terminal T11 through power supply control circuit 52. In the present embodiment, the potential of terminal T11 being the power supply potential means that the first power supply signal is the on signal, and the potential of terminal T11 being the ground potential means that the first power supply signal is the off signal.

Terminal T11 of integrated ECU 50 and terminal T12 of AC charging ECU 10 are connected to each other through direct line S1. Therefore, the potential of terminal T11 and the potential of terminal T12 are equal to each other. In AC charging ECU 10, controller 11 has terminals T3, T21 and T22. Terminal T2 and terminal T3 are connected to each other through a power line and switch 12*a* (power supply switch) is provided in the middle of the power line. Terminal T21 is an output terminal of the second power supply signal. The above-described second power supply signal is output from terminal T21 of controller 11. Terminal T22 is an input terminal of a monitor signal. The monitor signal output from monitor circuit 13 is input to terminal T22. Although details will be described below, the monitor signal is a signal for informing controller 11 about whether the first power supply signal is the on signal or the off signal.

In AC charging ECU 10, power supply circuit 12 includes switch 12*a*, a self-holding circuit 12*b* and a transistor Tr21. Self-holding circuit 12*b* includes a transistor Tr22. A base of transistor Tr22 is connected to terminal T21 through a control line. Monitor circuit 13 includes a transistor Tr3. An emitter of transistor Tr3 is grounded and a voltage of power supply wiring P3 is applied between the emitter and a collector of transistor Tr3. The collector of transistor Tr3 is connected to terminal T22 through a control line. In the present embodiment, switch 12*a* is a P-channel MOSFET (Metal Oxide Semiconductor Field Effect Transistor), and each of transistors Tr21, Tr22 and Tr3 is an NPN-type bipolar transistor.

In AC charging ECU 10, a control line CL1 connected to terminal T12 branches off into two control lines CL2 and CL3 at a branch point B. Control line CL2 is connected to a base of transistor Tr21 in power supply circuit 12 and control line CL3 is connected to a base of transistor Tr3 in monitor circuit 13. Therefore, the potential of terminal T12, a base potential of transistor Tr21 and a base potential of transistor Tr3 are equal to one another. Although the control line branches off inside AC charging ECU 10 in the present embodiment, direct line S1 may branch off. One control line branching off in the middle of direct line S1 (i.e., outside AC charging ECU 10) may be connected to power supply circuit 12, and the other may be connected to monitor circuit 13.

Switch 12*a* is configured to enter the on state when the ground potential is applied to a gate of switch 12*a*. Transistor Tr21 and transistor Tr22 are connected in parallel between the gate of switch 12*a* and the ground in power supply circuit 12. An emitter of each of transistors Tr21 and Tr22 is grounded and a voltage of auxiliary battery 60 is applied between the emitter and a collector of each of transistors Tr21 and Tr22. When transistors Tr21 and Tr22 are both off, a potential of auxiliary battery 60 is applied to the gate of switch 12*a* and switch 12*a* enters the off state. When switch 12*a* is in the off state, electric power supply from auxiliary battery 60 is blocked by switch 12a and thus electric power is not supplied to terminal T3. On the other hand, when at least one of transistors Tr21 and Tr22 is on, the ground potential is applied to the gate of switch 12a and switch 12a enters the on state. When switch 12a is in the on state, electric power of auxiliary battery 60 is supplied from terminal T2 through switch 12a to terminal T3. Transistors Tr21 and Tr22 according to the present embodiment correspond to one example of "first switch" and "second switch" according to the present disclosure, respectively.

Transistor Tr21 is controlled by the first power supply signal input from terminal T11 of integrated ECU 50 to terminal T12 of AC charging ECU 10 through direct line S1. For example, when the first power supply signal is the on signal, the power supply potential of power supply wiring P2 is applied to the base of transistor Tr21 and transistor Tr21 is turned on. When the first power supply signal is the off signal, the base potential of transistor Tr21 is the ground potential and transistor Tr21 is turned off.

As described above, the base potential of transistor Tr21 and the base potential of transistor Tr3 are equal to each other. Therefore, when the first power supply signal is the on signal, transistor Tr3 is also turned on, and when the first power supply signal is the off signal, transistor Tr3 is also turned off. When transistor Tr3 is on, the potential of terminal T22 is the ground potential, and when transistor Tr3 is off, the power supply potential of power supply wiring P3 is applied to terminal T22. The potential of terminal T22 that changes in accordance with whether the first power supply signal is the on signal or the off signal corresponds to the above-described monitor signal. In the present embodiment, the potential of terminal T22 being the ground potential means that the first power supply signal is the on signal, and the potential of terminal 122 being the power supply potential means that the first power supply signal is the off signal.

Transistor Tr22 is controlled by the second power supply signal input from controller 11 to the base of transistor Tr22. For example, when the potential applied from controller 11 to the base of transistor Tr22 is a low-level potential (e.g., the ground potential), transistor Tr22 is off. When a high-level potential (e.g., a potential higher than the ground potential) is applied from controller 11 to the base of transistor Tr22, transistor Tr22 is turned on.

Next, the power supply control of the controller of the lower ECU in the control system according to the present embodiment will be described with reference to FIGS. 4 to 6. The power supply control of the controller of the lower ECU is executed by integrated ECU 50 corresponding to the upper ECU. Although the power supply control of controller 11 of AC charging ECU 10 will be representatively described below, the power supply control of the controllers (controllers 21, 31 and 41) of the other lower ECUs is also executed basically similarly.

FIG. 4 shows transition of signals input to the respective terminals of the circuit shown in FIG. 3 and transition of a state (operating/stop) of the controller of the lower ECU, when the power supply switch of the controller of the lower ECU is in the normal state, in the power supply control of the controller of the lower ECU according to the present embodiment.

Referring to FIG. 4 together with FIG. 3, in the example of FIG. 4, controller 51 of integrated ECU 50 turns on the power supply of controller 11 of AC charging ECU 10 at timing $t_A$. More specifically, controller 51 applies the high-level potential to the base of transistor Tr11. As a result, the first power supply signal input to terminal T12 is switched to the on signal (line L12). When the first power supply signal is switched to the on signal, transistor Tr21 is turned on and switch 12a enters the on state. When switch 12a enters the on state, electric power of auxiliary battery 60 is supplied to terminal T3 of controller 11 (line L11) and controller 11 starts up (line L14). Then, started controller 11 switches the second power supply signal output from terminal T21 to the on signal (line L13). As a result, the high-level potential is applied to the base of transistor Tr22. As to "T3" in FIG. 4, a state in which electric power is being supplied to terminal T3 is denoted as "ON", and a state in which electric power is not being supplied to terminal T3 is denoted as "OFF". The same applies as well to "T3" in FIGS. 5, 8 and 9 below.

In the example of FIG. 4, controller 51 of integrated ECU 50 outputs a signal for turning off the power supply of controller 11 of AC charging ECU 10 at timing $t_B$. More specifically, controller 51 applies the low-level potential to the base of transistor Tr11. As a result, the first power supply signal input to terminal T12 is switched to the off signal (line L12). Controller 11 maintains the second power supply signal at the on signal until the self-holding period elapses from timing to at which the first power supply signal is switched from the on signal to the off signal (line L13). In the example of FIG. 4, a period from timing $t_B$ to timing $t_C$ corresponds to the self-holding period. When the self-holding period elapses (i.e., when timing to comes), controller 11 switches the second power supply signal to the off signal (line L13). When the first power supply signal and the second power supply signal are both the off signals, transistors Tr21 and Tr22 are both turned off and switch 12a enters the off state. When switch 12a enters the off state, electric power of auxiliary battery 60 is no longer supplied to terminal T3 of controller 11 (line L11). As a result, controller 11 enters the stop state (line L14).

Thereafter, at timing $t_E$, controller 51 again turns on the power supply of controller 11. More specifically, controller 51 switches the first power supply signal to the on signal and controller 11 thereby starts up similarly to timing $t_A$ (see lines L11 to L14).

FIG. 5 shows transition of the signals input to the respective terminals of the circuit shown in FIG. 3 and transition of the state (operating/stop) of the controller of the lower ECU, when the power supply switch is fixed to the on state after startup of the controller of the lower ECU (e.g., a period from timing $t_A$ to timing $t_C$), in the power supply control of the controller of the lower ECU according to the present embodiment. The example of FIG. 5 will be described below, mainly focusing on the difference from the example of FIG. 4. Line L12 in FIG. 5 is the same as line L12 in FIG. 4.

Referring to FIG. 5 together with FIG. 3, in the example of FIG. 5 as well, the first power supply signal and the second power supply signal are both the off signals at timing $t_C$ at which the self-holding period has elapsed, similarly to the example of FIG. 4 (lines L12 and L23). However, in the example of FIG. 5, switch 12a is fixed to the on state during the period from timing $t_A$ to timing $t_C$. Therefore, even when the self-holding period elapses (i.e., even when timing $t_C$ comes), switch 12a does not enter the off state and is maintained in the on state. As a result, electric power of auxiliary battery 60 continues to be supplied to terminal T3 of controller 11 (line L21).

The controller (e.g., controller 11) of the lower ECU according to the present embodiment voluntarily enters the stop state and is prohibited from entering the operating state, when the controller does not enter the stop state within a prescribed period (hereinafter, also referred to as "abnormality determination period") after the second power supply signal is switched to the off signal. In the example of FIG. 5, a period from timing $t_C$ to timing to corresponds to the abnormality determination period. In the abnormality determination period, controller 11 is maintained in the operating state (line L24). When controller 11 does not enter the stop state after the abnormality determination period elapses (i.e., after timing to comes), controller 11 determines that there is an abnormality and performs a prescribed process (hereinafter, also referred to as "startup prohibition process") for prohibiting controller 11 from entering the operating state, and then, voluntarily enters the stop state (line L24). Examples of the startup prohibition process include turning on a value (an initial value is off) of a startup prohibition flag stored in the memory device of controller 11. Reference is made to the startup prohibition flag in the program executed by the processor of controller 11. When the value of the startup prohibition flag is on, startup of controller 11 is prohibited, and when the value of the startup prohibition flag is off, startup of controller 11 is permitted.

Thereafter, at timing $t_E$, controller 51 switches the first power supply signal to the on signal (line L12). However, due to the above-described startup prohibition process, controller 11 does not start up even when the first power supply signal is switched to the on signal (see lines L23 and L24).

Figure 6:
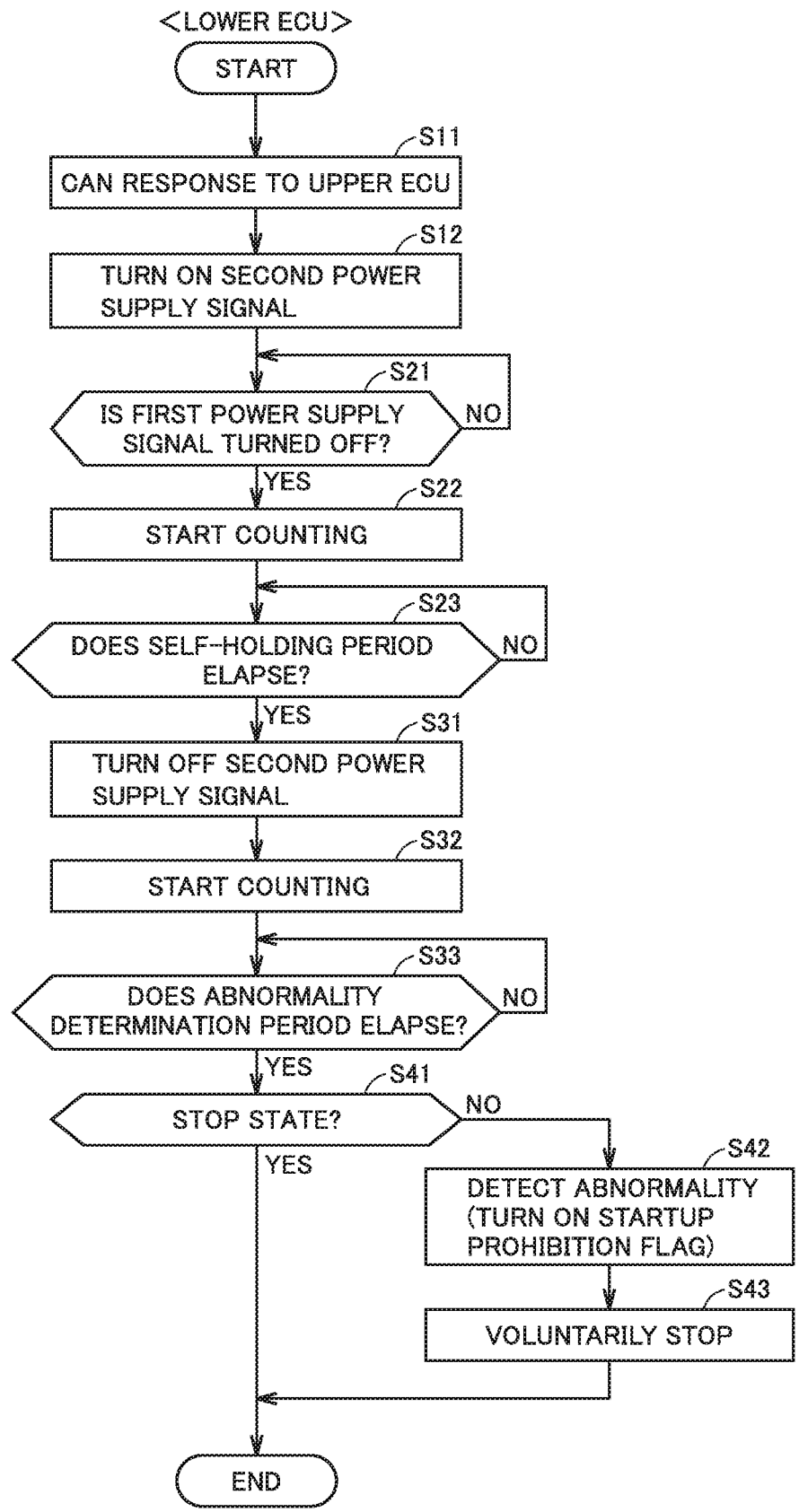
FIG. 6 is a flowchart showing a process procedure for the power supply control performed by the controller of the lower ECU of the control system according to the embodiment of the present disclosure.

FIG. 6 is a flowchart showing a process procedure for the power supply control performed by the controller (e.g., controller 11) of the lower ECU of the control system according to the present embodiment. The process shown in this flowchart is started when controller 11 starts up, for example.

Referring to FIG. 6, when controller 51 of integrated ECU 50 corresponding to the upper ECU switches the first power supply signal from the off signal to the on signal, controller 11 (the controller of the lower ECU) starts up. In step (hereinafter, also simply denoted as "S") 11, started controller 11 transmits a signal (hereinafter, also referred to as "response signal") indicating that controller 11 has started up to controller 51. Communication between controller 51 and controller 11 is, for example, CAN communication performed through local bus B1 (FIG. 1). The transmission of the response signal from controller 11 to controller 51 corresponds to response of controller 11 to the startup operation by controller 51. In the present embodiment, the controller (e.g., controller 11) of the lower ECU is configured to transmit the above-described response signal to the controller (i.e., controller 51) of the upper ECU at the time of startup. By receiving the response signal, the controller of the upper ECU recognizes that the controller of the lower ECU has normally started up.

Next, in 512, controller 11 switches the second power supply signal from the off signal to the on signal. Then, in S21, controller 11 determines whether or not the first power supply signal is switched to the off signal. While the first power supply signal is maintained at the on signal (NO in S21), the process in S21 is repeatedly performed at every prescribed control cycle. While the first power supply signal is maintained at the on signal, controller 11 is maintained in the operating state.

When it is determined in S21 that the first power supply signal is switched to the off signal (YES), controller 11 starts counting in S22. As a result, a time (hereinafter, also referred to as "first measurement time") that elapses since the first power supply signal was switched to the off signal is measured. In S23, controller 11 determines whether or not the first measurement time exceeds a prescribed time (hereinafter, referred to as "$C_A$"). $C_A$ corresponds to a parameter that defines the above-described self-holding period. The first measurement time exceeding $C_A$ (YES in S23) means that the self-holding period elapses. While it is determined that the first measurement time does not exceed $C_A$ (NO in S23), the process in S23 is repeatedly performed at every prescribed control cycle. The period during which determination of NO is made in S23 corresponds to the self-holding period and controller 11 is maintained in the operating state during the self-holding period.

A known timer can be used to measure each of the above-described first measurement time and a second measurement time described below. Such a timer can be implemented by software or by hardware. For example, a counter (variable) may be prepared in the memory device of controller 11 to determine whether or not a counter value reaches a prescribed value, while incrementing the counter at every control cycle.

When it is determined in S23 that the first measurement time exceeds $C_A$ (YES), controller 11 switches the second power supply signal from the on signal to the off signal in S31, and starts counting in S32. As a result, a time (hereinafter, also referred to as "second measurement time") that elapses since the second power supply signal was switched to the off signal is measured. In S33, controller 11 determines whether or not the second measurement time exceeds a prescribed time (hereinafter, referred to as "$C_B$"). $C_B$ corresponds to a parameter that defines the above-described abnormality determination period. The second measurement time exceeding $C_B$ (YES in S33) means that the abnormality determination period elapses. While it is determined that the second measurement time does not exceed $C_B$ (NO in S33), the process in S33 is repeatedly performed at every prescribed control cycle. The period during which determination of NO is made in S33 corresponds to the abnormality determination period. Based on whether or not controller 11 itself enters the stop state during the abnormality determination period, controller 11 determines whether or not power supply circuit 12 has an abnormality. As described below, when controller 11 itself does not enter the stop state within the abnormality determination period, controller 11 determines that power supply circuit 12 has an abnormality.

When it is determined in S33 that the second measurement time exceeds $C_B$ (YES), controller 11 determines in S41 whether or not controller 11 itself is in the stop state. When controller 11 is in the stop state (YES in S41), the process in FIG. 6 ends. When controller 11 enters the stop state, the processor of controller 11 cannot execute the program. Therefore, when controller 11 enters the stop state within the abnormality determination period, the process in FIG. 6 ends at the timing when controller 11 enters the stop state.

On the other hand, when it is determined in S41 that controller 11 is not in the stop state (NO), controller 11 detects the abnormality in S42 and performs a prescribed process (a process at the time of detection of an abnormality). In the present embodiment, the process at the time of detection of the abnormality includes the above-described startup prohibition process. More specifically, controller 11 turns on the value (the initial value is off) of the startup prohibition flag in the memory device. Furthermore, controller 11 may perform at least one of notification about the occurrence of the abnormality in power supply circuit 12 and recording of the occurrence of the abnormality in power supply circuit 12. For example, controller 11 may control display and/or ringing of a not-shown prescribed mobile device (e.g., a smartphone or a smart watch) through wireless communication to notify the user that power supply circuit 12 has the abnormality. Controller 11 may also turn on a value (an initial value is off) of a diagnosis (on-board diagnostics) flag in the memory device to record the occurrence of the abnormality in power supply circuit 12 in the memory device.

After the process in S42, controller 11 voluntarily enters the stop state in S43. As a result, the operation of entire controller 11 stops. More specifically, power supply to the processor and the peripheral functions (e.g., the timer) is stopped (shut down) in controller 11, to thereby stop the operation of entire controller 11. When the process in S43 is performed, the process in FIG. 6 ends. Since the value of the startup prohibition flag is turned on in S42, controller 11 is prohibited from starting up (i.e., controller 11 is prohibited from entering the operating state again) after controller 11 enters the stop state in S43 is prohibited. Since startup of controller 11 is prohibited, the above-described response signal (S11) is not transmitted from controller 11 to controller 51 when controller 51 switches the first power supply signal from the off signal to the on signal.

The prohibition of startup of controller 11 in S42 above can be canceled. For example, the above-described prohibition may be canceled by performing a recovery process (e.g., replacement of switch 12a) for the abnormality of power supply circuit 12 (e.g., fixation of switch 12a to the on state), and then, returning the value of the startup prohibition flag to off.

Figure 7:
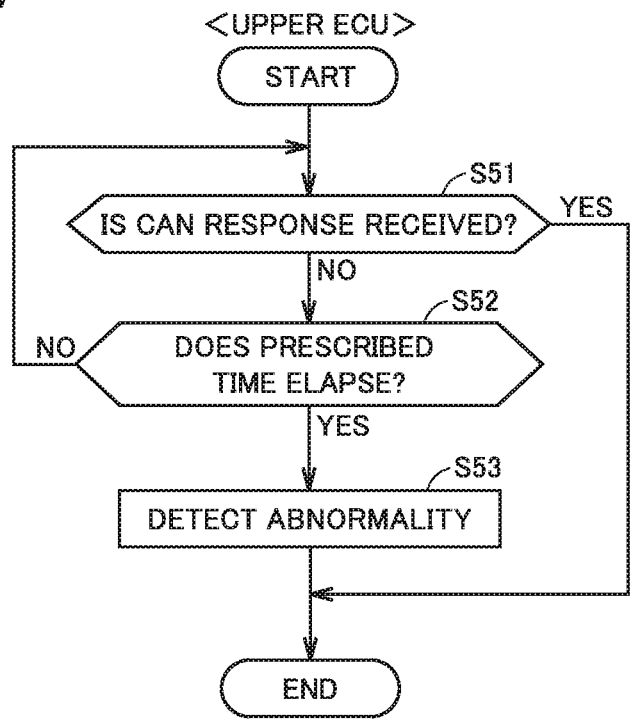
FIG. 7 is a flowchart showing a process procedure for abnormality detection performed by a controller of the upper ECU of the control system according to the embodiment of the present disclosure.

FIG. 7 is a flowchart showing a process procedure for abnormality detection performed by the controller (controller 51) of the upper ECU of the control system according to the present embodiment. The process shown in this flowchart is started when the first power supply signal transmitted to power supply circuit 12 of controller 11 is switched from the off signal to the on signal, for example.

Referring to FIG. 7, in S51, controller 51 determines whether or not controller 51 receives the above-described response signal (S11 in FIG. 6) from controller 11 (i.e., whether or not a CAN response is received). When it is determined in S51 that controller 51 receives the response signal (YES), controller 51 determines that power supply circuit 12 does not have an abnormality, and ends the process in FIG. 7 without performing the below-described process at the time of detection of an abnormality (S53).

On the other hand, when it is determined in S51 that controller 51 does not receive the response signal (NO), controller 51 determines in S52 whether or not a prescribed time elapses since the first power supply signal was switched from the off signal to the on signal. While it is determined in S52 that the prescribed time does not elapse (NO), the processes in S51 and S52 are repeatedly performed at every prescribed control cycle. When it is determined that controller 51 does not receive the response signal (NO in S51) and it is determined in 852 that the prescribed time elapses (YES), controller 51 determines that power supply circuit 12 has an abnormality. The prescribed time used in S52 is a parameter that defines a time period during which controller 51 can receive the response signal when power supply circuit 12 is normal, and an appropriate value is preliminarily obtained by, for example, experiment or simulation and stored in the memory device of controller 51. The prescribed time may be a fixed value, or may be variable depending on the condition of the vehicle.

As described above, controller 51 determines whether or not controller 11 starts up, based on whether or not controller 51 receives the response signal within a prescribed time period (e.g., a time period from switching of the first power supply signal to the on signal to a lapse of the prescribed time). When controller 51 does not receive the response signal within the prescribed time period, controller 51 determines that controller 11 does not start up. When controller 11 does not start up even if the first power supply signal is switched to the on signal, controller 51 determines that power supply circuit 12 has an abnormality.

When controller 51 determines that power supply circuit 12 has an abnormality (YES in S52), controller 51 detects the abnormality and performs the prescribed process (the process at the time of detection of an abnormality) in S53. For example, controller 51 performs at least one of notification about the occurrence of the abnormality and recording of the occurrence of the abnormality. Controller 51 may control notification device 400 to notify the user of the occurrence of the abnormality. Any method may be used as a method for notifying the user. The user may be notified by displaying a character, an image or any other information on the display device, or may be notified by sound (including voice) with a speaker, or may be notified by causing a prescribed lamp to light up (including flashing). Controller 51 may also turn on a value (an initial value is oft) of the diagnosis (on-board diagnostics) flag in the memory device to record the occurrence of the abnormality in power supply circuit 12 in the memory device.

In the control system according to the present embodiment, the controller (controller 51) of the upper ECU performs the process in FIG. 7, and thus, the controller of the upper ECU can recognize whether or not the lower ECU (e.g., AC charging ECU 10) has an abnormality. The controller of the upper ECU is configured to collectively manage information (e.g., presence or absence of an abnormality) about a plurality of lower ECUs. Based on such information, the controller of the upper ECU can appropriately execute integrated control of the plurality of lower ECUs.

As described above, in the control system and the vehicle according to the present embodiment, the controller (controller 11, 21, 31, 41) of the lower ECU is configured to voluntarily enter the stop state (S43 in FIG. 6), when the controller of the lower ECU does not enter the stop state even if the disconnection condition is satisfied (S31 in FIG. 6). As a result, electric power consumed in the controller of the lower ECU is reduced, and thus, a power shortage of auxiliary battery 60 (and further, auxiliary battery depletion) is less likely to occur. Therefore, in the control system and the vehicle according to the present embodiment, a power shortage of auxiliary battery 60 can be suppressed.

In the above-described embodiment, the controller (e.g., controller 11) of the lower ECU voluntarily enters the stop state in S43 in FIG. 6 and the operation of the entire controller stops. However, the present disclosure is not limited to such a configuration. The controller may enter the power saving mode (e.g., the sleep mode), instead of entering the stop state. In this case as well, when an abnormality occurs, electric power consumed in the controller is reduced, and thus, a power shortage of auxiliary battery 60 (and further, auxiliary battery depletion) is less likely to occur. The sleep mode is a power saving mode of reducing the electric power consumed in the controller, by stopping a clock of the processor (i.e., stopping the operation of the processor) while operating the peripheral functions (e.g., the timer), without stopping power supply in the controller. However, the present disclosure is not limited to the sleep mode, and any power saving mode can be used. For example, by decreasing the operation speed of the processor, electric power required for the operation can be reduced. When a clock frequency is decreased, the operation speed is decreased.

In the above-described embodiment, the self-holding period is provided, and the disconnection condition is satisfied when the first power supply signal is the off signal and the second power supply signal is the off signal. However, the present disclosure is not limited to such a configuration. The disconnection condition can be changed as appropriate, as long as the disconnection condition includes a condition that the first power supply signal is switched from the on signal to the off signal. In some embodiments, the self-holding circuit 12b (and further, the self-holding period), and the self-holding circuit 12b (and further, the self-holding period) may be omitted. For example, the power supply switch may be controlled only by the first power supply signal, and the disconnection condition may be satisfied when the first power supply signal is switched from the on signal to the off signal. A modification of the power supply control of the controller of the lower ECU will be described below with reference to FIGS. 8 and 9.

Figure 8:
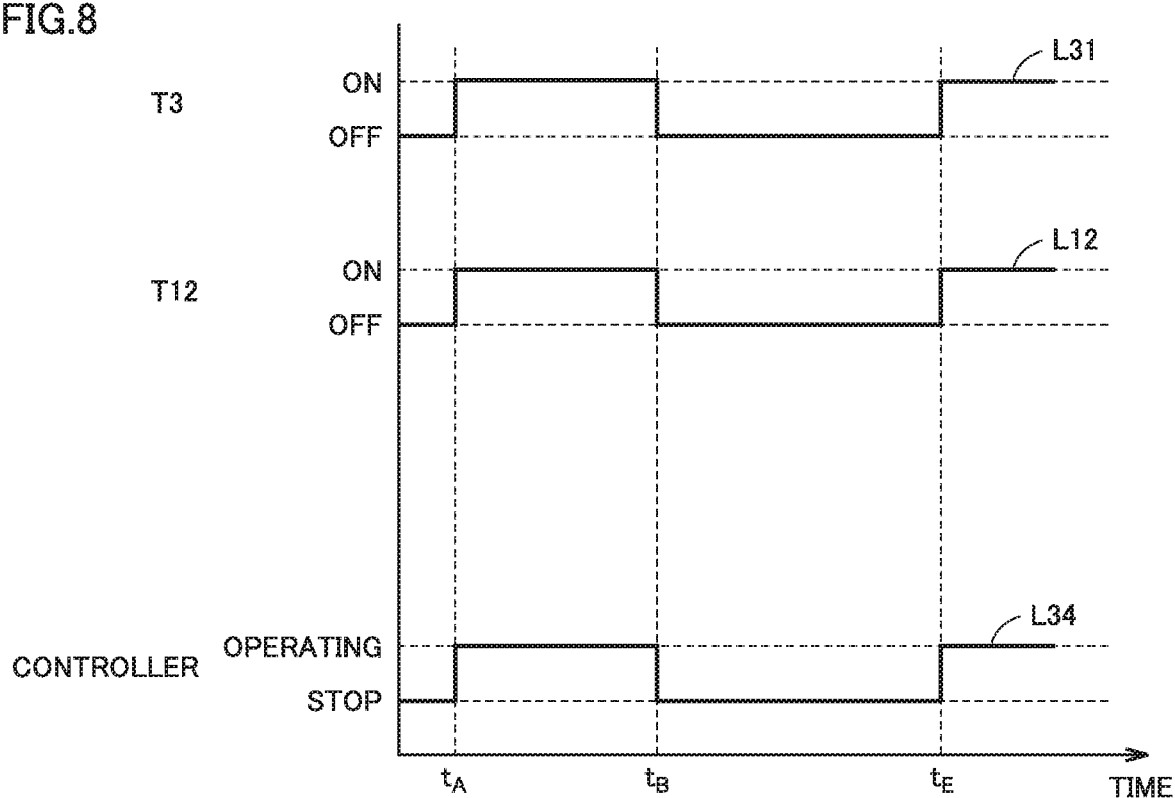
FIG. 8 shows transition of the signals and transition of the state (operating/stop) of the controller when the power supply switch of the controller of the lower ECU is in the normal state, in a modification of the power supply control of the controller of the lower ECU.

FIG. 8 shows transition of the signals and transition of the state of the controller, when the power supply switch of the controller of the lower ECU is in the normal state, in the modification of the power supply control of the controller of the lower ECU. The example of FIG. 8 will be described below, mainly focusing on the difference from the example of FIG. 4. Line L12 in FIG. 8 is the same as line L12 in FIG. 4.

Referring to FIG. 8 together with FIG. 3, in the example of FIG. 8, self-holding circuit 12b shown in FIG. 3 is omitted and the second power supply signal is not used. When the first power supply signal is switched from the on signal to the off signal at timing to (line L12), switch 12a enters the off state. When switch 12a enters the off state, electric power of auxiliary battery 60 is no longer supplied to terminal T3 of controller 11 (line L31). As a result, controller 11 enters the stop state (line L34).

Figure 9:
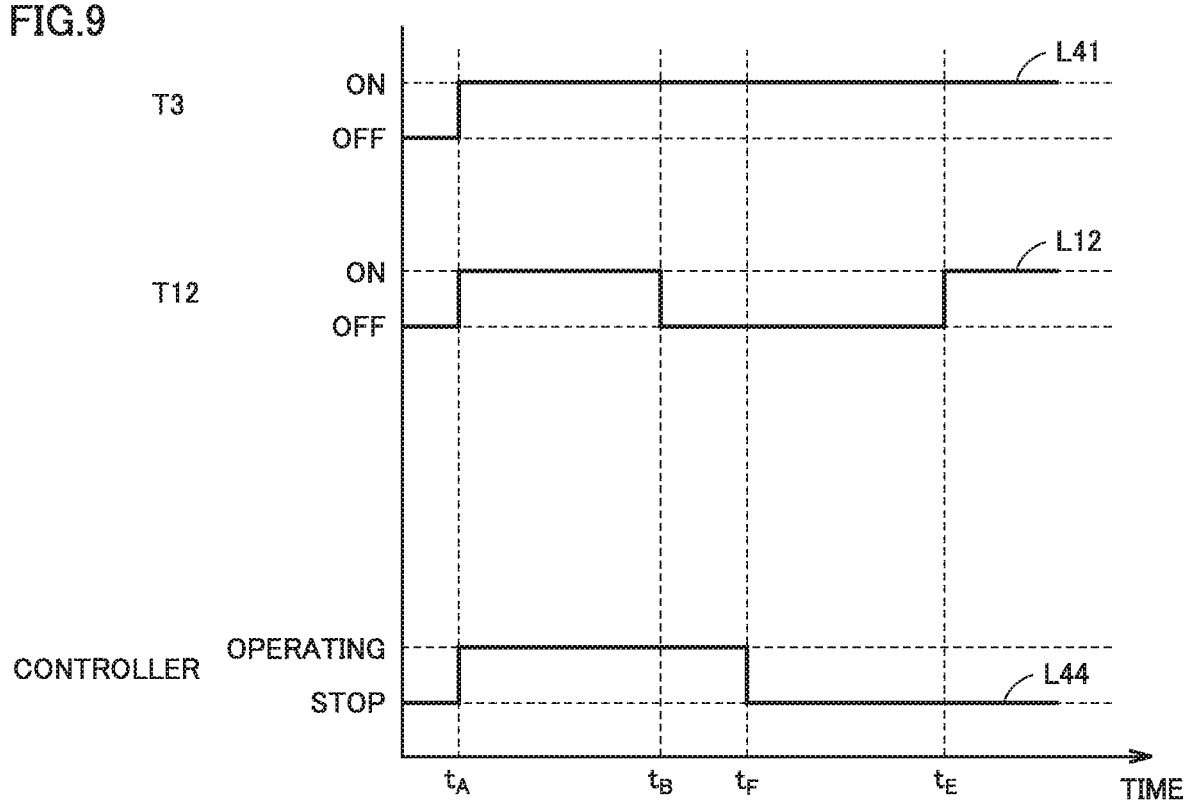
FIG. 9 shows transition of the signals and transition of the state of the controller when the power supply switch is fixed to the connected state after the controller of the lower ECU starts up, in the modification of the power supply control of the controller of the lower ECU.

FIG. 9 shows transition of the signals and transition of the state of the controller, when the power supply switch is fixed to the on state after the controller of the lower ECU starts up (e.g., a period from timing $t_A$ to timing $t_B$), in the modification of the power supply control of the controller of the lower ECU. The example of FIG. 9 will be described below, mainly focusing on the difference from the example of FIG. 8. Line L12 in FIG. 9 is the same as line L12 in FIG. 8.

Referring to FIG. 9 together with FIG. 3, in the example of FIG. 9 as well, the first power supply signal is switched from the on signal to the off signal at timing to, similarly to the example of FIG. 8 (line L12). However, in the example of FIG. 9, switch 12a is fixed to the on state during the period from timing $t_A$ to timing $t_B$. Therefore, even if the first power supply signal is switched to the off signal, switch 12a does not enter the off state and is maintained in the on state. As a result, electric power of auxiliary battery 60 continues to be supplied to terminal T3 of controller 11 (line L41). In the present modification, controller 11 voluntarily enters the stop state or the power saving mode, when controller 11 does not enter the stop state within a prescribed abnormality determination period after the first power supply signal is switched to the off signal. In addition, controller 11 is prohibited from entering the operating state (including recovery from the power saving mode). In the example of FIG. 9, a period from timing $t_B$ to timing $t_F$ corresponds to the abnormality determination period. During the abnormality determination period, controller 11 is maintained in the operating state (line L44). When controller 11 does not enter the stop state after the abnormality determination period elapses (i.e., after timing $t_F$ comes), controller 11 determines that there is an abnormality, and performs the prescribed startup prohibition process and then voluntarily enters the stop state or the power saving mode (line L44).

In the above-described modification as well, when an abnormality occurs, controller 11 enters the stop state or the power saving mode and electric power consumed in controller 11 is reduced. Therefore, a power shortage of auxiliary battery 60 (and further, auxiliary battery depletion) is less likely to occur. In the above-described embodiment and modification, the startup prohibition process may be omitted.

In the above-described embodiment, the connection condition is satisfied when the first power supply signal is switched firm the off signal to the on signal. However, the present disclosure is not limited to such a configuration. The connection condition can be changed as appropriate, as long as the connection condition includes a condition that the first power supply signal is switched from the off signal to the on signal. For example, the present disclosure may be configured such that the connection condition is not satisfied when a signal for requesting not to connect an electric power supply path of the second controller (i.e., not to turn on the power supply switch of the second controller) is transmitted from a controller other than the first controller to the power supply circuit of the second controller even if the first power supply signal is switched from the off signal to the on signal by the first controller.

Power conversion performed in each of AC charging circuit 14, DC charging circuit 24 and the WPT charging circuit of power reception device 34 can be changed as appropriate. For example, at least one of AC charging circuit 14, DC charging circuit 24 and the WPT charging circuit of power reception device 34 may include a DC/DC converter and be configured to perform transformation as the power conversion.

In the above-described embodiment, the charging ECU and the communication ECU are used as the second controller. However, the second controller is not limited to the charging ECU and the communication ECU, and may be a controller used for any other control. In addition, the number of the second controllers can be changed as appropriate. For example, the number of the second controllers may be one.

The applicable range of the control system is not limited to a vehicle and the control system may be applied to any object. The control system may be applied to, for example, any other vehicle (e.g., a ship or an airplane), or may be applied to an unmanned movable body (e.g., an automatic guided vehicle (AGV), an agricultural machine or a drone), or may be applied to a building (e.g., a house or a factory).

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A control system comprising a first controller, at least one second controller, a power supply circuit controlled by the first controller, and a monitor circuit,
   the power supply circuit including a power supply switch configured to perform switching between connection and disconnection of an electric power supply path from a power supply to the second controller, the power supply switch being configured to be controlled by a first power supply signal transmitted from the first controller to the power supply circuit and to be controlled by a second power supply signal transmitted from the second controller to the power supply circuit, the power supply circuit being configured to bring the power supply switch into a disconnected state to thereby bring the second controller into a stop state, when a prescribed disconnection condition is satisfied, the prescribed disconnection condition including a condition that the first power supply signal is switched from an on signal to an off signal, the monitor circuit being configured to inform the second controller about whether the first power supply signal is the on signal of the off signal, the second controller being configured to voluntarily enter the stop state or a power saving mode, when an abnormality causes the second controller to not enter the stop state even if the disconnection condition is satisfied, the second controller is configured to maintain the second power supply signal at an on signal until a prescribed self-holding period elapses since the first power supply signal is switched from the on signal to the off signal, and switch the second power supply signal to an off signal when the self-holding period elapses, the disconnection condition is satisfied when the first power supply signal is the off signal and the second power supply signal is the off signal, and the second controller is configured to voluntarily enter the stop state or the power saving mode, when the second controller does not enter the stop state within a prescribed period after the second power supply signal is switched to the off signal.

2. The control system according to claim 1, wherein the second controller is configured to voluntarily enter the stop state or the power saving mode and be prohibited from entering an operating state, when the second controller does not enter the stop state even if the disconnection condition is satisfied.

3. The control system according to claim 1, wherein the power supply circuit includes:
a first switch configured to be controlled by the first power supply signal; and
a second switch configured to be controlled by the second power supply signal,
the power supply switch is configured to enter a connected state when a ground potential is applied to the power supply switch, and
the first switch and the second switch are connected in parallel between the power supply switch and a ground.

4. The control system according to claim 1, wherein the power supply circuit is configured to bring the power supply switch into a connected state to thereby start up the second controller, when a prescribed connection condition is satisfied, the prescribed connection condition including a condition that the first power supply signal is switched from the off signal to the on signal, and the first controller is configured to determine that the power supply circuit has an abnormality, when the second controller does not start up even if the connection condition is satisfied.

5. The control system according to claim 4, wherein the second controller is configured to transmit a prescribed signal to the first controller at the time of startup, and the first controller is configured to determine whether or not the second controller starts up, based on whether or not the first controller receives the prescribed signal.

6. The control system according to claim 4, wherein the first controller is configured to perform at least one of notification about occurrence of the abnormality and recording of occurrence of the abnormality, when the first controller determines that the power supply circuit has the abnormality.

7. The control system according to claim 1, wherein the at least one second controller includes a plurality of second controllers, the plurality of second controllers each form charging ECUs configured to be supplied with electric power in accordance with different power feeding methods and perform charging of a vehicle-mounted battery, the first controller is configured to individually control the power supply switch of each of the plurality of second controllers, the first controller is configured to, when the charging is not performed, bring the power supply switch of each of the plurality of second controllers into the disconnected state, and the first controller is configured to, when the charging is performed using electric power supplied in accordance with a prescribed power feeding method, maintain the power supply switch of the at least one second controller not corresponding to the prescribed power feeding method in the disconnected state and bring the power supply switch of the second controller corresponding to the prescribed power feeding method into a connected state.

8. A vehicle comprising the control system as recited in claim 1,
the power supply being an auxiliary battery.

9. A control system comprising a first controller, at least one second controller, and a power supply circuit controlled by the first controller, the power supply circuit including a power supply switch configured to perform switching between connection and disconnection of an electric power supply path from a power supply to the second controller, the power supply switch being configured to be controlled by a first power supply signal transmitted from the first controller to the power supply circuit, the power supply circuit being configured to bring the power supply switch into a disconnected state to thereby bring the second controller into a stop state when a prescribed disconnection condition is satisfied, the prescribed disconnection condition including a condition that the first power supply signal is switched from an on signal to an off signal, the power supply circuit being configured to bring the power supply switch into a connected state to thereby start up the second controller, when a prescribed connection condition is satisfied, the prescribed connection condition including a condition that the first power supply signal is switched from the off signal to the on signal, the first controller being configured to determine that the power supply circuit has an abnormality, when the second controller does not start up even if the connection condition is satisfied, and the second controller being configured to voluntarily enter the stop state or a power saving mode, when the second controller does not enter the stop state even if the disconnection condition is satisfied.

10. The control system according to claim 9, wherein
the second controller is configured to voluntarily enter the stop state or the power saving mode and be prohibited from entering an operating state, when the second controller does not enter the stop state even if the disconnection condition is satisfied.

11. The control system according to claim 9, wherein
the second controller is configured to transmit a prescribed signal to the first controller at the time of startup, and
the first controller is configured to determine whether or not the second controller starts up, based on whether or not the first controller receives the prescribed signal.

12. The control system according to claim 9, wherein
the first controller is configured to perform at least one of notification about occurrence of the abnormality and recording of occurrence of the abnormality, when the first controller determines that the power supply circuit has the abnormality.

13. The control system according to claim 9, wherein
the at least one second controller includes a plurality of second controllers,
the plurality of second controllers each form charging ECUs configured to be supplied with electric power in accordance with different power feeding methods and perform charging of a vehicle-mounted battery,
the first controller is configured to individually control the power supply switch of each of the plurality of second controllers,
the first controller is configured to, when the charging is not performed, bring the power supply switch of each of the plurality of second controllers into the disconnected state, and
the first controller is configured to, when the charging is performed using electric power supplied in accordance with a prescribed power feeding method, maintain the power supply switch of the at least one second controller not corresponding to the prescribed power feeding method in the disconnected state and bring the power supply switch of the second controller corresponding to the prescribed power feeding method into the connected state.

14. A vehicle comprising the control system as recited in claim 9,
the power supply being an auxiliary battery.

15. A control system comprising a first controller, a plurality of second controllers, and a power supply circuit controlled by the first controller,
the power supply circuit including a power supply switch configured to perform switching between connection and disconnection of an electric power supply path from a power supply to the second controller,
the power supply switch being configured to be controlled by a first power supply signal transmitted from the first controller to the power supply circuit,
the power supply circuit being configured to bring the power supply switch into a disconnected state to thereby bring the second controller into a stop state, when a prescribed disconnection condition is satisfied, the prescribed disconnection condition including a condition that the first power supply signal is switched from an on signal to an off signal,
the plurality of second controllers each forming charging ECUs configured to be supplied with electric power in accordance with different power feeding methods and perform charging of a vehicle-mounted battery,
the first controller being configured to individually control the power supply switch of each of the plurality of second controllers,
the first controller being configured to, when the charging is not performed, bring the power supply switch of each of the plurality of second controllers into the disconnected state,
the first controller being configured to, when the charging is performed using electric power supplied in accordance with a prescribed power feeding method, maintain the power supply switch of the second controllers not corresponding to the prescribed power feeding method in the disconnected state and bring the power supply switch of the second controller corresponding to the prescribed power feeding method into a connected state, and
each of the second controllers being configured to voluntarily enter the stop state or a power saving mode, when the second controller does not enter the stop state even if the disconnection condition is satisfied.

16. The control system according to claim 15, wherein
the second controller is configured to voluntarily enter the stop state or the power saving mode and be prohibited from entering an operating state, when the second controller does not enter the stop state even if the disconnection condition is satisfied.

17. A vehicle comprising the control system as recited in claim 16,
the power supply being an auxiliary battery.

* * * * *